United States Patent
Lyngsøe et al.

(10) Patent No.: US 11,662,518 B2
(45) Date of Patent: May 30, 2023

(54) HOLLOW CORE OPTICAL FIBER AND A LASER SYSTEM

(71) Applicant: NKT Photonics A/S, Birkerød (DK)

(72) Inventors: Jens Kristian Lyngsøe, Hornbæk (DK); Christian Jakobsen, Virum (DK); Mattia Michieletto, Copenhagen (DK)

(73) Assignee: NKT PHOTONICS A/S, Birkerød (DK)

(*) Notice: Subject to any disclaimer, the term of this patent is extended or adjusted under 35 U.S.C. 154(b) by 0 days.

(21) Appl. No.: 17/942,709

(22) Filed: Sep. 12, 2022

(65) Prior Publication Data

US 2023/0018465 A1    Jan. 19, 2023

Related U.S. Application Data

(63) Continuation of application No. 17/213,653, filed on Mar. 26, 2021, now Pat. No. 11,474,293, which is a
(Continued)

(30) Foreign Application Priority Data

Dec. 23, 2015 (DK) ............................ PA 2015 70877
Apr. 27, 2016 (DK) ............................ PA 2016 70263

(51) Int. Cl.
*G02B 6/02* (2006.01)
*G02B 6/42* (2006.01)

(52) U.S. Cl.
CPC ...... *G02B 6/02328* (2013.01); *G02B 6/02338* (2013.01); *G02B 6/02366* (2013.01);
(Continued)

(58) Field of Classification Search
None
See application file for complete search history.

(56) References Cited

U.S. PATENT DOCUMENTS 3,990,874 A    11/1976    Schulman
4,551,162 A    11/1985    Hicks
(Continued)

FOREIGN PATENT DOCUMENTS

CN    1269020 A    10/2000
CN    1649801 A    8/2005
(Continued)

OTHER PUBLICATIONS

International Search Report (PCT/ISA/210) dated Jun. 30, 2017, by the Norwegian Patent Office as the International Searching Authority for International Application No. PCT/DK2017/050127.
(Continued)

*Primary Examiner* — Jerry Rahll
(74) *Attorney, Agent, or Firm* — Buchanan Ingersoll & Rooney P.C.

(57) ABSTRACT

A hollow core photonic crystal fiber (PCF) including an outer cladding region and seven hollow tubes surrounded by the outer cladding region. Each of the hollow tubes is fused to the outer cladding to form a ring defining an inner cladding region and a hollow core region surrounded by the inner cladding region. The hollow tubes are not touching each other, but are arranged with distance to adjacent hollow tubes. The hollow tubes each have an average outer diameter d2 and an average inner diameter d1, wherein d1/d2 is equal to or larger than about 0.8, such as equal to or larger than about 0.85, such as equal to or larger than about 0.9. Also, a laser system.

19 Claims, 15 Drawing Sheets

Related U.S. Application Data continuation of application No. 16/701,690, filed on Dec. 3, 2019, now Pat. No. 10,989,866, which is a continuation of application No. 16/064,751, filed as application No. PCT/DK2016/050460 on Dec. 22, 2016, now Pat. No. 10,527,782.

(52) U.S. Cl.
CPC ........ *G02B 6/02371* (2013.01); *G02B 6/4206* (2013.01); *G02B 6/4296* (2013.01)

(56) References Cited

U.S. PATENT DOCUMENTS

| | | | |
|---|---|---|---|
| 4,575,181 A | 3/1986 | Ishikawa | |
| 4,737,011 A | 4/1988 | Iri et al. | |
| 5,018,821 A | 5/1991 | Kurata | |
| 5,210,816 A | 5/1993 | Iino et al. | |
| 5,960,139 A | 9/1999 | Henning | |
| 6,347,178 B1 | 2/2002 | Edwards et al. | |
| 6,795,635 B1 | 9/2004 | Fajardo et al. | |
| 6,888,992 B2 | 5/2005 | Russell et al. | |
| 6,892,018 B2 | 5/2005 | Libori et al. | |
| 6,954,574 B1 | 10/2005 | Russell et al. | |
| 6,985,661 B1 | 1/2006 | Russell et al. | |
| 7,242,835 B2 | 7/2007 | Busse et al. | |
| 7,306,376 B2 | 12/2007 | Scerbak et al. | |
| 7,321,712 B2 | 1/2008 | Williams et al. | |
| 7,373,062 B2 | 5/2008 | Huber | |
| 7,792,408 B2 | 9/2010 | Varming | |
| 7,793,521 B2 | 9/2010 | Gallagher et al. | |
| 8,215,129 B2 | 7/2012 | Russell et al. | |
| 8,306,379 B2 | 11/2012 | Benabid et al. | |
| 8,393,804 B2 | 3/2013 | Nielson et al. | |
| 8,854,728 B1 | 10/2014 | Brooks et al. | |
| 8,938,146 B2 | 1/2015 | Lyngse et al. | |
| 10,139,560 B2 | 11/2018 | Poletti et al. | |
| 10,551,574 B2 | 2/2020 | Alkeskjold et al. | |
| 2002/0118938 A1 | 8/2002 | Hasegawa et al. | |
| 2003/0068150 A1 | 4/2003 | Ariel et al. | |
| 2003/0230118 A1 | 12/2003 | Dawes et al. | |
| 2005/0185908 A1 | 8/2005 | Roberts et al. | |
| 2005/0232560 A1 | 10/2005 | Knight et al. | |
| 2005/0238301 A1 | 10/2005 | Russell et al. | |
| 2005/0286847 A1 | 12/2005 | Arimondi et al. | |
| 2006/0130528 A1 | 6/2006 | Nelson et al. | |
| 2006/0193583 A1 | 8/2006 | Dong et al. | |
| 2007/0009216 A1 | 1/2007 | Russell et al. | |
| 2007/0204656 A1 | 9/2007 | Gallagher et al. | |
| 2007/0237453 A1 | 10/2007 | Nielsen et al. | |
| 2007/0292087 A1 | 12/2007 | Brown | |
| 2008/0310806 A1 | 12/2008 | Mukasa | |
| 2009/0252459 A1 | 10/2009 | Nielson et al. | |
| 2009/0320526 A1 | 12/2009 | Carberry et al. | |
| 2010/0124393 A1 | 5/2010 | Li et al. | |
| 2010/0132406 A1 | 6/2010 | Huenermann | |
| 2010/0135616 A1 | 6/2010 | Watte et al. | |
| 2010/0303429 A1 | 12/2010 | Gibson et al. | |
| 2010/0326139 A1 | 12/2010 | Sugizaki et al. | |
| 2011/0013652 A1 | 1/2011 | Knight et al. | |
| 2011/0194816 A1 | 8/2011 | Kumkar et al. | |
| 2011/0195515 A1 | 8/2011 | Beat et al. | |
| 2012/0141079 A1 | 6/2012 | Gibson et al. | |
| 2013/0208737 A1 | 8/2013 | Clowes et al. | |
| 2014/0029896 A1 | 1/2014 | Zheng et al. | |
| 2014/0211818 A1 | 7/2014 | Hou et al. | |
| 2015/0192732 A1 | 7/2015 | Moselund | |
| 2017/0097464 A1 | 4/2017 | Challener et al. | |
| 2017/0160467 A1 | 6/2017 | Poletti et al. | |
| 2018/0267235 A1 | 9/2018 | Russell et al. | |
| 2018/0339931 A1 | 11/2018 | Simonsen et al. | |
| 2018/0372961 A1 | 12/2018 | Alkeskjold et al. | |
| 2019/0011634 A1 | 1/2019 | Lyngsøe et al. | |
| 2019/0101695 A1 | 4/2019 | Poletti et al. | |
| 2019/0135679 A1 | 5/2019 | Jakobsen et al. | |
| 2020/0103587 A1 | 4/2020 | Lyngsøe et al. | |
| 2020/0166699 A1 | 5/2020 | Bauerschmidt et al. | |
| 2020/0310039 A1 | 10/2020 | Alkeskjold et al. | |
| 2021/0323856 A1 | 10/2021 | Simonsen et al. | |
| 2021/0341682 A1 | 11/2021 | Alkeskjold et al. | |
| 2022/0011501 A1 | 1/2022 | Lyngsøe et al. | |

FOREIGN PATENT DOCUMENTS

| | | |
|---|---|---|
| CN | 101122651 A | 2/2008 |
| CN | 101210977 A | 7/2008 |
| CN | 101426743 A | 5/2009 |
| CN | 101779149 A | 7/2010 |
| CN | 102066996 A | 5/2011 |
| CN | 201845110 U | 5/2011 |
| CN | 102815864 A | 12/2012 |
| CN | 103823277 A | 5/2014 |
| CN | 104078124 A | 10/2014 |
| CN | 104297839 A | 1/2015 |
| CN | 104568841 A | 4/2015 |
| EP | 1096285 A2 | 5/2001 |
| EP | 2322489 A1 | 5/2011 |
| EP | 2479594 A1 | 7/2012 |
| EP | 2533081 A1 | 12/2012 |
| GB | 2097149 A | 10/1982 |
| GB | 2255199 A | 10/1992 |
| GB | 2387666 A | 10/2003 |
| GB | 2518420 A | 3/2015 |
| JP | S62178203 A | 8/1987 |
| JP | S6486104 A | 3/1989 |
| JP | H0186104 U | 6/1989 |
| JP | H052118 A | 1/1993 |
| JP | H0792355 A | 4/1995 |
| JP | 2000180660 A | 6/2000 |
| JP | 2001166176 A | 6/2001 |
| JP | 2001318244 A | 11/2001 |
| JP | 2003107281 A | 4/2003 |
| JP | 2003107294 A | 4/2003 |
| JP | 2003279758 A | 10/2003 |
| JP | 2004077979 A | 3/2004 |
| JP | 2004191947 A | 7/2004 |
| JP | 2004339004 A | 12/2004 |
| JP | 2005043638 A | 2/2005 |
| JP | 2006039147 A | 2/2006 |
| JP | 2006276882 A | 10/2006 |
| JP | 2008020741 A | 1/2008 |
| JP | 2009116193 A | 5/2009 |
| JP | 2009528248 A | 8/2009 |
| JP | 2010215458 A | 9/2010 |
| JP | 2011526704 A | 10/2011 |
| JP | 2011232706 A | 11/2011 |
| WO | 9900685 A1 | 1/1999 |
| WO | 9935524 A2 | 7/1999 |
| WO | 0146734 A1 | 6/2001 |
| WO | 03078338 A2 | 9/2003 |
| WO | 03080524 A1 | 10/2003 |
| WO | 2004083918 A1 | 9/2004 |
| WO | 2004083919 A1 | 9/2004 |
| WO | 2005012197 A2 | 2/2005 |
| WO | 2005091029 A2 | 9/2005 |
| WO | 2006072025 A2 | 7/2006 |
| WO | 2007106305 A2 | 9/2007 |
| WO | 2009010317 A1 | 1/2009 |
| WO | 2009157977 A1 | 12/2009 |
| WO | 2010084964 A1 | 7/2010 |
| WO | 2012168400 A1 | 12/2012 |
| WO | 2013168400 A2 | 11/2013 |
| WO | 2015003714 A1 | 1/2015 |
| WO | 2015003715 A1 | 1/2015 |
| WO | 2015144181 A1 | 10/2015 |
| WO | 2015185761 A1 | 12/2015 |
| WO | 2017080564 A1 | 5/2017 |
| WO | 2017108061 A1 | 6/2017 |

OTHER PUBLICATIONS

Written Opinion (PCT/ISA/237) dated Jun. 30, 2017, by the Norwegian Patent Office as the International Searching Authority for International Application No. PCT/DK2017/050127.

(56) References Cited

OTHER PUBLICATIONS

Search Report dated Jun. 3, 2018, by the Danish Patent and Trademark Office in corresponding Application No. PA 2015 70724. (5 pages).
The extended European Search Report dated Jul. 9, 2019, by the European Patent Office in European Patent Application No. 16877822.3-1003. (12 pages).
Search Report and Search Opinion dated Jun. 2, 2016, by Danish Patent and Trademark Office in corresponding Application No. PA 2015 70876. (6 pages).
Search Report dated Jun. 30, 2016 by the Danish Patent and Trademark Office in corresponding Application No. PA 2015 70877. (4 pages).
International Search Report (PCT/ISA/210) dated Mar. 3, 2017, by the Denmark Patent Office as the International Searching Authority for International Application No. PCT/DK2016/050460.
Written Opinion (PCT/ISA/237) dated Mar. 3, 2017, by the Denmark Patent Office as the International Searching Authority for International Application No. PCT /DK2016/050460.
The extended European Search Report dated May 28, 2019, by the European Patent Office in European Patent Application No. 16863710.6-1105. (8 pages).
Written Opinion dated Oct. 4, 2019, by the Intellectual Property Office of Singapore in corresponding Singapore Patent Application No. 11201804707Y. (8 pages).
U.S. Appl. No. 15/774,780, "Office Action (Non-Final) Received". (26 pages).
PA 2015 70724, "Search Report Received". (5 pages).
PA 2015 70876, "Search Report and Search Opinion Received". (6 pages).
PA 2015 70877, "Search Report Received". (4 pages).
Belardi, W. et al., "Design and properties of hollow antiresonant fibers for the visible and near infrared spectral range", arXivdoi: 10.1364/OE.23.017394.
Office Action (First Office Action) dated Oct. 12, 2019 in the corresponding Chinese Patent Application No. 201680075502.8, English translation of the Office Action. (29 pages).
Office Action (Second Office Action) dated Apr. 8, 2020 in the corresponding Chinese Patent Application No. 201680075502.8. (7 pages).
Office Action dated Oct. 28, 2020, by the State Intellectual Property Office of the People's Republic of China (National Chinese Bureau) in corresponding Chinese Patent Application No. 201680075508.5 and an English Translation of the Office Action. (6 pages).
Office Action (First Office Action) dated Oct. 8, 2019, by the State Intellectual Property Office of the People's Republic of China (National Chinese Bureau) in corresponding Chinese Patent Application No. 201680075508.5 and an English Translation of the Office Action. (13 pages).
Office Action (Second Office Action) dated Jun. 9, 2020 by the China National Intellectual Property Administration in the corresponding Chinese Patent Application No. 201680075508.5 and an English Translation of the Office Action. (14 pages).
Office Action (First Office Action) dated Sep. 8, 2020 by the China National Intellectual Property Administration in corresponding Chinese Patent Application No. 201680078462.2 and an English Translation of the Office Action. (43 pages).
Office Action (Communication pursuant to Article 94(3) EPC) dated Oct. 10, 2020, by the European Patent Office in corresponding European Application No. 16 863 710.6-1105. (5 pages).
Extended European Search Report dated Jul. 23, 2019 in the corresponding European Patent Application No. 16877821.5-1003. (11 pages).
Extended European Search Report dated Dec. 4, 2019 in the corresponding European Patent Application No. 17788848.4-1105. (8 pages).
Office Action (Communication pursuant to Article 94(3) EPC) dated Jun. 17, 2020 by the European Patent Office in the corresponding European Patent Application No. 16877822.3-1001. (7 pages).

Gunendi, M. C., et al., "Broad-band robustly single-mode hollow-core PCF by resonant filtering of higher order modes". (7 pages).
Habib, MD. S., et al., "Low-loss hollow-core silica fibers with adjacent nested anti-resonant tubes", vol. 23, No. 13, Optics Express, Jun. 24, 2015. (13 pages).
Kolyadin, A., et al., "Light transmission in negative curvature hollow core fiber in extremely high material loss region", Opt. Express, vol. 21, No. 8, 9514-9519. (6 pages).
Kolyadin, A. N., et al., "Negative curvature hollow-core fibers: dispersion properties and femtosecond pulse delivery", Elsevier—Physics Procedia, vol. 73, pp. 59-66.
Office Action dated Dec. 1, 2020, by the Japanese Patent Office in corresponding Japanese Application No. 2018-532357, with English Translation. (15 pages).
Office Action dated Nov. 24, 2020, by the Japanese Patent Office in corresponding Japanese Patent Application No. 2018-532462 (6 pages).
PCT/DK2016/050460, "Written Opinion Received".
PCT/DK2016/050460, "International Search Report Received".
PCT/DK2017/050127, "Written Opinion Received". (10 pages).
PCT/DK2017/050127, "International Search Report Received". (8 pages).
Poletti, F., "Nested antiresonant nodeless hollow core fiber", vol. 22, No. 20, Opt. Express, Sep. 22, 2014. (22 pages).
Written Opinion dated Oct. 10, 2019 in the corresponding Singapore Patent Application No. 11201803831T. (8 pages).
Examination Report dated Sep. 8, 2020 by the Intellectual Property Office of Singapore in corresponding Singapore Patent Application No. 11201804738S. (4 pages).
SG 11201804738S, "Written Opinion Received". (8 pages).
Sorensen, T., et al., "Metal-assisted coupling to hollow-core photonic crystal fibres", Electronics Letters, vol. 41, No. 12, Jun. 9, 2005. (2 pages).
Vincetti, L., et al., "Waveguiding mechanism in tube lattice fibers", vol. 18, No. 22, Optics Express, Oct. 25, 2010. (14 pages).
Office Action (Communication pursuant to Article 94(3) EPC) dated Aug. 4, 2021 by the European Patent Office in corresponding European Application No. 16 877 822.3-1001. (6 pages).
Office Action (Notice of Reasons for Refusal) dated Oct. 28, 2021, by the Japanese Patent Office in corresponding Japanese Patent Application No. 2018-532357, and an English Translation of the Office Action. (12 pages).
Belardi, W. et al."Hollow antiresonant fibers with low bending loss" Optics Express, vol. 22, No. 8, 2014, 6 pages.
Office Action (Notice of Reasons for Refusal) dated Mar. 1, 2022, by the Japanese Patent Office in corresponding Japanese Patent Application No. 2018-532357, and an English Translation of the Office Action. (6 pages).
Belardi et al., "Hollow Antiresonant Fibers with Low Bending Loss", Optics Express, vol. 22, No. 8, 2014, 6 pages.
Notification of Reasons for Rejection dated Apr. 19, 2022, issued in the corresponding Japanese Patent Application No. 2018-532462, with English Translation, 11 pages.
Office Action dated Dec. 19, 2022, by the Canadian Intellectual Property Office in Canadian Patent Application No. 3,008,053 (6 pages).
Office Action (First Office Action) dated Jan. 5, 2023, by the State Intellectual Property Office in corresponding Chinese Patent Application No. 202110941422.9, and an English Translation of the Office Action. (23 pages).
Office Action (First office Action) dated Jan. 5, 2023, by the State Intellectual Property Office in corresponding Chinese Patent Application No. 202110941824.9 and an English Translation of the Office Action. (22 pages).
Office Action (First Office Action) dated Jan. 5, 2023, by the China National Intellectual Property Administration In corresponding Chinese Patent Application No. 202110941824.9, and an English Translation only, (8 pages).
Office Action (First Office Action) issued on Jan. 5, 2023, by the China National Intellectual Property Administration In corresponding Chinese Patent Application No. 202110941422.9, English Translation only. (9 pages).

HOLLOW CORE OPTICAL FIBER AND A LASER SYSTEM

CROSS REFERENCE TO RELATED APPLICATIONS

The present application is a continuation of U.S. application Ser. No. 17/213,653, filed on Mar. 26, 2021, which is a continuation of U.S. application Ser. No. 16/701,690, filed on Dec. 3, 2019, which is a continuation of U.S. application Ser. No. 16/064,751, filed on Jun. 21, 2018, which is a U.S. National Stage of International Application No. PCT/DK2016/050460, filed on Dec. 22, 2016, which claims the benefit of Danish Application No. PA 2016-70263, filed on Apr. 27, 2016, and Danish Application No. PA 2015-70877, filed on Dec. 23, 2015. The entire contents of each of U.S. application Ser. No. 17/213,653, U.S. application Ser. No. 16/701,690, U.S. application Ser. No. 16/064,751, International Application No. PCT/DK2016/050460, Danish Application No. PA 2016-70263, and Danish Application No. PA 2015-70877 are hereby incorporated herein by reference in their entirety.

TECHNICAL FIELD

The invention relates to a hollow core photonic crystal fiber and a laser system comprising such hollow core optical fiber.

BACKGROUND ART

Hollow core photonic crystal fibers (PCF) have been known for many years and in some applications are very attractive to use compared to solid core PCF due to their very low propagation loss, low nonlinear effects and high damage threshold.

A hollow-core fiber is an optical fiber which guides light essentially within a hollow region, so that only a minor portion of the optical power propagates in solid fiber material surrounding the core. The hollow region may be filled with air or any other gas or it may be evacuated to have a very low gas pressure.

Over the years several types of hollow core PCFs have been developed, such as hollow-core photonic bandgap fibers e.g. as described in U.S. Pat. No. 6,892,018, Kagome design type fibers e.g. as described in U.S. Pat. No. 8,306,379.

The kagome type fiber guides light by means of an anti-resonant effect and allows for a substantially broader spectral transmission than that achieved in photonic bandgap fibers.

In recent years such hollow core anti-resonant fibers (ARFs) have been studied intensively in particular with the aim of further improving the fiber with respect to low loss and broad spectral transmission.

In an attempt to reduce the attenuation Kolyadin et al, Optics Express, Vol 21, pages 9514 to 9519, 2013 suggested a hollow core fiber with a hollow core surrounded by eight identical capillaries. It was concluded that to reduce loss, a larger core size is preferred and by increasing the number of capillaries in the cladding a reduced loss could be achieved.

Another drawback of prior art hollow core anti-resonant fibers is that they are not purely single mode waveguides because they also support some higher-order modes (HOMs).

Since these HOMs often have a relatively low loss, it is very difficult to launch a pure LP01 mode without HOM contamination and further HOMs can be excited by bending or external stress.

In an attempt to solve this problem and to achieving the highest possible suppression of HOMs while maintaining a reasonably low loss for the LP01 mode, a modified fiber design was suggest in "Broad-band robustly single-mode hollow-core PCF by resonant filtering of higher order modes" by Gunedi et al., Cornell university library arXiv: 1508.06747 [physics.optics], 27 Aug. 2015. The ARR fiber described in this article comprises a central hollow core (inner diameter D) surrounded by six evenly spaced and non-touching capillaries (in the following also called hollow tubes) with a wall thickness t and an inner diameter d, supported within a thick-walled supporting capillary. The non-touching glass elements had modes which were tailored to ensure resonant phase-matched coupling to higher-order core modes, causing them to leak at a very high rate into the supporting solid glass sheath. It was found that extremely high suppression of HOMs could be achieved over broad wavelength bands where the fiber guides with a low loss, provided the ratio d/D 0.68 and the walls of the tubes walls T were thin enough i.e. t/D=0.01.

WO15185761 describes a similar anti-resonant hollow-core fiber comprising a first tubular, cladding element which defines an internal cladding surface, a plurality of second tubular elements which are attached to the cladding surface and together define a core with an effective radius, the second tubular elements being arranged in spaced relation and adjacent one of the second tubular elements having a spacing there between, and a plurality of third tubular elements, each nested within a respective one of the second tubular elements. It was concluded that the optimal number of tubes for suppressing HOMs was six.

DESCRIPTION OF THE INVENTION

The object of the invention is to provide a hollow core PCF which alleviates at least one of the drawbacks described above.

In an embodiment it is an object to provide a hollow core PCF which has a high spectral transmission and a high suppression of HOMs.

In an embodiment it is an object to provide a hollow core PCF which has a high single mode transmission efficiency and is substantially insensitive to bending.

In an embodiment it is an object to provide a hollow core PCF which in a simple way can be designed to have a desired low loss transmission band with a bandwidth of at least about 50 nm and preferably with a transmission loss of less than about 50 dB/Km.

In an embodiment it is an object to provide a hollow core PCF which has a transmission band comprising wavelengths in the range of from about 400 nm to about 1200 nm.

These and other objects have been solved by the invention or embodiments thereof as defined in the claims and as described herein below.

It has been found that the invention or embodiments thereof have a number of additional advantages which will be clear to the skilled person from the following description.

The phrase "radial distance" means distance determined in radial direction from the center axis of the hollow core. The phrase "radial direction" is a direction from the core center axis and radially outwards.

The term "substantially" should herein be taken to mean that ordinary product variances and tolerances are comprised.

The term "about" is generally used to include what is within measurement uncertainties. The term "about" when used in ranges should herein be taken to mean that what is within measurement uncertainties are included in the range.

It should be emphasized that the term "comprises/comprising" when used herein is to be interpreted as an open term, i.e. it should be taken to specify the presence of specifically stated feature(s), such as element(s), unit(s), integer(s), step(s) component(s) and combination(s) thereof, but does not preclude the presence or addition of one or more other stated features.

Throughout the description or claims, the singular encompasses the plural unless otherwise specified or required by the context.

Diameters, thickness and other structural values are seen in a cross sectional view of the hollow core PCF unless otherwise specified or clear from the context.

The hollow core photonic crystal fiber (PCF) of the invention comprises an outer cladding region and 7 hollow tubes surrounded by the outer cladding region. Each of the hollow tubes is fused to the outer cladding to form a ring defining an inner cladding region and a hollow core region surrounded by the inner cladding region. The hollow tubes are not touching each other. It has been found to be advantageous for suppressing of undesired higher order modes that the hollow tubes each has an average outer diameter which is referred to as d2 and an average inner diameter which is referred to as d1. The ration d1/d2 is equal to or larger than about 0.8.

The average outer diameter d2 and/or the average inner diameter of the respective hollow tubes may be equal or different from hollow tube to hollow tube In an embodiment d1 and/or d2 is/are substantially identical for at least three of the hollow tube, such as for all of the seven hollow tubes.

According to the invention and against all teaching of prior art hollow core PCF it has surprisingly been found that a hollow core PCF with a non-touching inner cladding structure where there are seven non-touching tubes provides a highly increased suppression of higher order modes (HOMs) than the above described hollow core PCF with six non-touching inner cladding tubes. In particular—and as shown in the example—it has been found that the hollow core PCF of the invention with seven non-touching tubes has an increased suppression of HOMs with azimuthal number above 1, such a third order HOMs while simultaneously having low loss in the fundamental mode of at least a transmission band below 2 µm, preferably below 1.5 µm.

The term "transmission band" is herein used to mean a band with a bandwidth of at least about 10 nm, such as at least about 25 nm and preferably at least about 50 nm or even at least about 100 nm of transmission wavelength.

The term "low loss transmission band" means a transmission band for light in its fundamental mode with a transmission loss of less than about 100 dB/km, preferably less than about 60 dB/km and more preferably less than about 50 dB/km.

It has further been found that by increasing the ration d1/d2 the low loss transmission band may be achieved at even lower wavelengths such as a low loss transmission band comprising wavelengths below 1200 nm, such as below 1 µm, such as below 800 µm, such as below 600 my. Advantageously the ration d1/d2 is equal to or larger than about 0.85, such as equal to or larger than about 0.9.

The outer cladding comprises solid cladding material and is preferably entirely of solid material.

In an embodiment the hollow tubes are arranged with a substantially equal distance to adjacent hollow tubes. Thereby a very high Gaussian beam quality may be obtained. In an alternative embodiment the hollow tubes are arranged with different distances to adjacent hollow tubes. In the latter embodiment the variation in distance between adjacent hollow tubes is provided by having different outer diameters d2 of the tubes. Where the inner diameter d1 and/or the outer diameter d2 of the hollow tubes differs, the inner diameter d1, respectively the outer diameter d2 is calculated as the average d1 and d2 values, unless the calculation is the hollow tube thickness or otherwise specified. Accordingly the ration d1/d2 is determined by the average d1 and d2 values. It has been found that the optimal suppression of HOMs requires that the minimum distance between adjacent hollow tubes is relatively low and preferably less than about half the outer diameter d2 of the hollow tubes. On the other hand, the distance should not be too narrow because this may result in the risk of fully eliminating the distance along parts of or along the whole fiber length due to surface tension and material attraction during drawing of the fiber. To avoid such risk it is desired that the minimum distance between adjacent hollow tubes is at least 0.01 times d2.

Advantageously the minimum distance between adjacent hollow tubes is at least about 0.1 µm, such as at least about 1 µm, such as at least about 2 µm, such as at least about 5 µm.

In an embodiment the minimum distance between adjacent hollow tubes is about 5 µm or less, such as about 4 µm or less.

It has been found to be optimal that the center to center distance A between adjacent hollow tubes is between about 1.01*d2 and about 1.5*d2, such as between 1.05*d2 and 1.2*d2.

The hollow tubes advantageously have substantially parallel center axis. In practice the center axis of the hollow tubes may deviate slightly from being straight due to process variations. The hollow tubes may for example be helical around the core with a very long pitch, such as a pitch of up to 1 km, such as from 1 cm to 100 m.

Due to the structure of the hollow core PCF the core may in principle be designed with any diameter of the core region. The core region is advantageously substantially circular. In an embodiment the core region is not circular, but rather oval or angular, such as substantially pentagonal. The core diameter D is defined as the diameter of the largest circle inscribed by the 7 hollow tubes.

Advantageously the hollow core region has a core diameter D of from about 10 µm to about 100 µm, such as from about 10 am to about 60 µm.

It has been found that the optimal core diameter D is scalable with the central wavelength of the transmission band of the hollow core PCF.

For a central wavelength of about 1.0 µm. the core diameter D is advantageously as from about 20 am to about 50 µm, such as from about 25 am to about 40 µm. The preferred core diameter D is directly proportionally scaled with the central wavelength of the transmission band of the hollow core PCF.

It has been found that the hollow core PCF may have a very high beam quality even where the core is relatively large. In an embodiment the beam quality $M^2$ is about 1.75 or less, such as about 1.6 or less, such as about 1.5 or even less.

In an embodiment the average outer tube diameter relative to the core diameter d2/D is from about 0.5 to about 0.75, such as from about 0.65 to about 0.72, thereby a desired minimum distance between the hollow tubes and a very effective suppression of HOMs—in particular of $3^{rd}$ and $4^{th}$ HOMs—are ensured.

Further the mode quality of the beam obtained with a hollow core PCF average outer tube diameter relative to the core diameter d2/D is from about 0.5 to about 0.75 has shown to be very high.

It has been found the wall thickness of the hollow tubes largely influences the low loss transmission band or bands of the hollow core PCF. In fact, the wall thickness t of relevance has been found to be the core center facing region of the wall of the hollow tubes.

Thus it has been found that the wall thickness t (or the average value of t) of the core center facing region of the hollow tubes mainly affects the location with respect to wavelengths of the low loss transmission bands. In general the hollow core PCF may have one or several low loss transmission bands, such as 1, 2, 3, 4 or even further low loss transmission bands. Advantageously the hollow core PCF has at least 3 low loss transmission bands, such as at least 4 low loss transmission bands. For obtaining one or more low loss bands below 1.2 μm it is desired that the wall thickness t is up to about 2.1 μm, such as up to about 1 μm, such as in the range from about 150 to about 350 nm or in the range from about 650 to about 850 nm or in the range from about 900 to about 2.1 μm.

For example it has been found that for a hollow core PCF of an embodiment of the invention the fiber has a low loss transmission at 1030-1064 nm for a wall thickness t=150-350 nm, preferably 200-300 nm (low loss transmission band with highest wavelengths—band I), for a wall thickness t=650-850 nm, preferably 700-800 nm (2nd highest wavelengths low loss transmission band—band II), and for a wall thickness of 5 times first range for a third transmission band comprising 1030-1064 nm i.e. 5*150 nm to 5*350 nm, seven times first range for a fourth transmission band comprising 1030-1064 nm and so on).

Advantageously the hollow core PCF is designed such that the hollow core guides light in the fundamental mode and comprises at least one wavelength between 200 nm and 4000 nm wavelength, such as between 400 and 2000 nm, such as between 800 and 1600 nm, such as between 1000 and 1100 nm, where the loss is less than about 1000 dB/km.

Advantageously the hollow core PCF has a low loss transmission band for the fundamental mode with a transmission loss of less than about 100 dB/km, preferably less than about less than 60 dB/km and more preferably less than 50 dB/km comprising wavelengths in the interval between 1000 and 1100 nm and preferably comprising at least the wavelengths 1030-1064 nm In an embodiment the hollow core PCF has a transmission loss for HOMs in its low transmission band for the fundamental mode of larger than about 2000 dB/km, thereby ensuring an effective single mode transmission.

It has further been found that the hollow core PCF is substantially insensitive to bending, for example it has been found that the hollow core PCF of an embodiment of the invention has a low loss which is less than about 5%/km at 1030-1060 nm when coiled at a diameter of about 6 cm.

Advantageously the wall thickness t of each of the hollow tubes is substantially identical. Preferably the hollow tubes are substantially identical and are arranged with identical distance to adjacent hollow tubes. Thereby the hollow core PCF becomes simpler to design for a desired wavelength transmission.

In an embodiment at least one of the tubes has a different wall thickness t than at least one other of the hollow tubes. Preferably 3 of the hollow tubes have a wall thickness and the remaining 4 hollow tubes have another wall thickness. It has been found that by this arrangement the hollow core PCF may become birefringent, largely depending on the difference in wall thickness t and the relative position of the hollow tubes with larger and smaller wall thickness t.

In an embodiment at least one of the hollow tubes has a wall thickness which is at least about 5% larger than the wall thickness of at least one of the other hollow tubes, preferably at least one of the hollow tubes has a wall thickness which is at least about 10% larger than the wall thickness of at least one other of the hollow tubes.

In an embodiment each of the hollow tubes is substantially circular. In practice it is very difficult to obtain absolutely circular hollow tubes, first of all due to a slight deformation where the respective hollow tubes are fused to the inner side of the outer cladding and secondly because the hollow tubes may be attracted to adjacent hollow tubes during the drawing of the fiber.

In an embodiment each of the hollow tubes has a long inner diameter $D_l$ and a short inner diameter $D_s$ perpendicular to the long inner diameter $D_l$, wherein $D_l$ is determined in radial direction from the hollow core center axis.

Advantageously the ration $D_s/D_l$ is from about 0.5 to about 0.99, such as from about 0.8 to about 0.99.

In an embodiment the $D_s/D_l$ ratio is larger than about 0.9, such as larger than about 0.95 which in practice is simpler to produce.

In an embodiment the $D_s/D_l$ ratio is smaller than about 0.95, such as smaller than 0.9 which results in a relative large core diameter D and thereby may add to reduce transmission loss for the fundamental mode.

In an embodiment at least one of the hollow tubes comprises at least one nested sub tube arranged in the hollow structure of the hollow tube wherein the sub tube is fused to the hollow tube, preferably aligned with the fusion to the outer cladding i.e. farthest from the core region.

The hollow tubes with one or more nested tubes may for example be as described for the PCF of WO15185761 comprising second tubular elements with third tubular elements nested within respective second tubular elements, with the difference that the hollow core PCF has 7 second tubular elements with nested third tubular tubes.

The sub tube advantageously has an average outer diameter $d_{sub}$, which is substantially smaller than the average inner diameter d of the hollow tube. The average outer diameter $d2_{sub}$ is preferably up to about 0.9*d2 of the hollow tube, such as up to about 0.9*d2, preferably the internal sub tube is fused to the hollow tube at its maximal radial distance to the core center axis.

In an embodiment at least one of the hollow tubes comprises one or more nodules arranged at a core center facing region of one or more of the hollow tubes, preferably the nodules are arranged at a boundary of the hollow core region, the nodules are preferably arranged to be antiresonant at an operating wavelength, so that light of a fundamental mode is substantially excluded from the nodules. Thereby an even stronger confinement of the fundamental mode may be obtained to further reduce loss of light in the fundamental mode transmitted in the core region of the hollow core PCF.

The nodules may advantageously be in form of nodule-like, or bead-like, formation or a locally thicker region of the wall extending along at least a part of the length of the fiber. Such nodules are sometimes referred to as nodes or blobbies in the prior art optical fibers e.g. as described in U.S. Pat. No. 7,321,712. The nodules and the remaining parts of the hollow tubes advantageously are of identical material.

The core region and/or the hollow tubes may in principle comprise any fluid. Preferably the core region and/or the hollow tubes independently of each other comprise gas determined at standard ambient temperature and pressure (SATP) as a temperature of 25° C. and an absolute pressure of exactly 100 000 Pa. Suitable gasses include air, argon, nitrogen or mixtures comprising any of the mentioned gasses. Optionally the hollow core region and/or the hollow tubes independently of each other are vacummated (evacuated to have a very low gas pressure) or filled with pressurized gas.

In an embodiment the hollow core region and/or the hollow tubes are vacummated to a pressure of about 1 mbar or less, such as to a pressure of about 0.1 mbar or less, such as to a pressure of about of 0.01 mbar or less at standard temperature.

In an embodiment the hollow core region and/or the hollow tubes are pressurized to a pressure of up to 2 bars, such as up to about 1.5 bars at standard temperature.

The outer cladding region may in principle have any size provided that it provides the hollow core PCF with a sufficient mechanical support for the hollow tubes. In an embodiment the outer cladding region has an outer diameter of at least about 125 µm, 150 µm, such as at least about 200 µm.

In general it is desired that the hollow core PCF is of one single material which is preferably glass, more preferably silica, optionally doped with a refractive index modifying dopant. In an embodiment one or more, such as all of the hollow tubes are of doped silica and the outer cladding region is of undoped silica. The dopant may for example include index changing materials such as F, Ge, P, B or combinations thereof.

Further it has been found that confinement loss may be reduced by providing the outer cladding region to comprise a photonic bandgap structure surrounding said inner cladding region.

The photonic bandgap structure may be provided by any means, e.g. by providing the outer cladding region with an index grating comprising concentric rings with different refractive index and/or by including microstructures having different index.

In an embodiment the outer cladding region comprises an outer background material having a refractive index $N_{oc}$ and a plurality of inclusions having a refractive index different from the refractive index of the background material. The inclusions advantageously have a lower refractive index than the refractive index of the background material. The inclusions are preferably extending substantially parallel with the core region. The inclusions may extend in a length section of the hollow core PCF or in substantially the entire length of the hollow core PCF.

In an embodiment the plurality of inclusions in the outer background material is arranged in a cross-sectional pattern comprising at least two rings of inclusions surrounding the inner cladding region, such as at least 3 rings, such as at least 4 rings of inclusions.

The phrase "ring of inclusions" refers to inclusions of the outer cladding inclusions having substantially equal radial distance to the core and being aligned in a ring configuration surrounding the core. Typically, a ring of inclusions is not fully circular, but rather is shaped with a number of soft angles, such as in a hexagonal shape. Preferably all the inclusions of a ring of inclusions are of substantially the same size and preferably of same solid material, voids and/or gas.

The background material may advantageously be silica, such as un-doped silica or doped silica. The dopant may for example include index changing materials such as F, Ge, P, B or combinations thereof.

In an embodiment the plurality of inclusions in the outer background material is arranged in a substantially hexagonal pattern.

In an embodiment the plurality of inclusions are voids or of gas, such as air.

The diameter(s) of the inclusions is/are advantageously selected to minimize loss of a selected wavelength or a range of wavelengths. Thus the diameter(s) may be selected to optimize for a desired transmission profile.

In an embodiment the inclusions have substantially identical diameters.

Advantageously the plurality of inclusions have an average diameter ($d_{inc}$) of up to about 2.5 µm, such as up to about 2 µm, such as between about 1.1 µm and 1.8 µm, such as between about 1.15 µm and about 1.7 µm, such as between about 1.2 am and about 1.5 µm, such as about 1.3 µm.

Also the distance(s) between the respective inclusions has shown to be relevant for optimizing (minimizing) confinement loss. In an embodiment for optimizing confinement loss the plurality of inclusions are arranged at a pitch ($\Lambda_{inc}$) of up to about 6 µm, such as up to about 5 µm, such as up to about 4 µm, such as between about 2 µm and 4 µm.

In an embodiment the inclusions are arranged at a pitch ($\Lambda_{inc}$) of up to about 3.5 µm, such as up to about 3 µm, such as up to about 2.5 µm, such as between about 1.1 µm and 2 µm.

The invention also comprises a laser system for delivering laser light to a user apparatus, the laser system comprising a laser light source and a fiber delivery cable for delivering light from the laser light source to the user apparatus, wherein the fiber delivery cable comprises a hollow core PCF as described above.

The fiber delivery cable comprising the hollow core PCF may preferably have a length of up to 50 m, such as from about 0.3 m to about 20 m, such as from about 1 m to about 15 m.

Advantageously the laser light source is configured for generating laser light pulses and is optically connected to the fiber delivery cable, preferably the laser light source is a femtosecond laser source.

The laser light source may in an embodiment be arranged for directly feed the light to the hollow core PCF e.g. by being fused to the hollow core PCF. In an embodiment the laser light source is arranged for feeding the light to the hollow core PCF via one or more optical elements and/or via free space.

In an embodiment the laser light source has a pump duration of from about 30 fs to about 30 ps, such as from about 100 fs to about 10 ps.

In an embodiment the laser light source has a peak power determined at the exit of the laser light source which is at least about 5 kW, such as at least about 10 kW, such as at least about 30 kW, such as at least about 50 kW.

The laser light source is advantageously a mode-locked laser light source. In an embodiment laser light source is an actively mode locked laser. In an embodiment the laser light source is a passively mode locked laser. The mode locked laser preferably comprises one or more amplifiers.

In an embodiment the hollow core PCF is configured for guiding light—preferably single mode light-comprising at least one wavelength in the range from about 200 nm to about 4.5 µm, preferably at least one wavelength in the range from 1000 nm to about 1100 nm.

In an embodiment the hollow core PCF is configured for guiding a continuum of light wavelengths, preferably spanning over at least about 0.1 µm, such as at least about 0.3 µm, such as at least about 0.5 µm.

In an embodiment the hollow core PCF has a first fiber end which is adapted for being connected to the user apparatus and a second fiber end optically connected to an output fiber of the laser light source via a fiber coupling structure. The fiber coupling structure preferably provides a protection of the first fiber end and preferably of a facet of the first fiber end to ensure that the facet and or the hollow core is not contaminated with dust, moisture or similar. Further to ensure a safe low loss connection the coupling structure may comprise a lens, such as a focusing lens, a graded-index element or other elements such as it is known in the art for coupling structures for hollow core fibers in general.

In an embodiment the fiber coupling structure comprises a focusing lens, for example such as it is described in U.S. Pat. No. 8,854,728.

In an embodiment the fiber coupling structure comprises a graded-index element (GRIN) such as it is described in US 2003/0068150.

In an embodiment the fiber coupling structure comprises a protection element such as it is described in U.S. Pat. No. 7,373,062.

In a preferred embodiment the first fiber end is mounted in a ferrule structure, preferably with a ferrule structure as described in PA 2015 70876 DK with the title "PHOTONIC CRYSTAL FIBER ASSEMBLY" and which application in hereby incorporated by reference into this disclosure with the proviso that in case of any inconsistence between the subject matter explicitly disclosed herein and the incorporated subject matter, the content of the subject matter explicitly disclosed herein prevail.

The hollow core PCF as described herein may advantageously be produced by drawing from a preform wherein the drawing is performed while controlling the pressure within the hollow tubes for example as described in U.S. Pat. Nos. 6,954,574, 8,215,129, 7,793,521 and/or in PA 2016 70262 DK with the title "A RING ELEMENT FOR A PREFORM, A PREFORM AND AN OPTICAL FIBER DRAWN FROM THE PREFORM"

The preform is advantageously produced by providing a hollow tube for the outer cladding region and 7 hollow tubes for the inner cladding, wherein the hollow tube for the outer cladding region has an inner diameter which is larger than two times, such as at least 3 times, such as at least 4 times larger than the outer diameter of the 7 hollow tubes—or if different—of the largest outer diameter of the 7 hollow tubes for the inner cladding. Preferably the outer cladding region has an inner diameter which is sufficiently large to arrange the 7 hollow tubes inside and in contact with the hollow tube for the outer cladding region such that the 7 hollow tubes are not touching each other. To arrange the 7 hollow tubes inside the hollow tube for the outer cladding region a short section of support elements (e.g. tubes or rods of glass) may be arranged at each end of the hollow tubes. After having fused the 7 hollow tubes to the hollow tube for the outer cladding region, the ends of the fused hollow tubes comprising the support elements may be cut off.

The preform may then be drawn in a fiber drawing tower preferably by simultaneously individual or common pressure control of the pressure within the respective hollow tubes.

In an embodiment the pressure control of each of one or more of the hollow tubes of the preform, also referred to as "elongate holes" or merely "holes", is provided by arranging a pressure tube between the hole and a pressure supply. The pressure supply ensures that the pressure within the hollow tube is controlled to a desired level via the pressure tube during the drawing of the fiber from the preform.

The pressure tube is advantageously a hollow pressure tube. The phrase "in the tube" refers to in the hollow part of the pressure tube.

Thus in an embodiment the method comprises inserting a first end of a pressure tube into the hole of the preform at a first end of the preform and subjecting the hole of the preform to a controlled pressure via the pressure tube during drawing. Advantageously at least a pressure tube length section comprising the first end of the pressure tube is inserted into the elongate hole of the preform. The pressure tube length section should preferably have a length of at least about 0.5 mm, such as from about 1 mm to about 20 cm, such as from about 2 mm to about 5 cm, such as from 0.5 to 1 cm.

In practice it is desired that the pressure tube length section has a length which is sufficient to provide a seal between the pressure tube length section and the elongate hole and yet it should not be too long since the length part of the preform comprising the pressure tube length section may in an embodiment not be drawn to fiber or if—in an alternative embodiment—it is drawn to fiber, the resulting fiber will then have different characteristics than the fiber drawn from preform material without the tube length section(s)

It has been found that a safe gas connection may be obtained between the elongate hole and the pressure tube by simply inserting the first end of the pressure tube into the hole and optionally providing that the pressure tube length section is expanded such that its outer surface fits to the periphery surface of the elongate hole and/or applying a sealing material, such as glue, epoxy, grease and/or rubber or any other pliable sealing material.

The pressure tube advantageously has an outer diameter and periphery selected such that it fits into the hole of the preform. The cross sectional shape of the hole may be round or oval or any other suitable shape. The surface defining the hole is also referred to as the periphery surface of the elongate hole. The pressure tube preferably has an outer cross sectional shape corresponding to the cross sectional shape of the hole of the preform, however with an average diameter slightly smaller than the average diameter of the hole of the preform, such that the first end of the pressure tube can be inserted into the hole.

In an embodiment the pressure tube or at least the pressure tube length section of the pressure tube has an average outer diameter which is from about 80% up to 100% of an average inner diameter of the hole, such as from about 90% to about 99% of the average diameter of the hole.

Advantageously the pressure tube has a supply section which is outside the hole i.e. the part of the pressure tube which leads from the hole to a gas connection to the pressure supply.

In an embodiment the supply section of the pressure tube has a supply opening which is in gas connection with a pressure source for controlling the pressure within the hole.

In an embodiment the supply section of the pressure tube has a supply opening which is within a pressure regulating chamber. By regulating the pressure within the pressure regulating chamber e.g. by the pressure source, the pressure within the pressure tube is also regulated and thereby the pressure within the elongate hole is regulated.

In an embodiment the supply section of the pressure tube has a supply opening which is directly connected to a pressure source for regulating the pressure within the pressure tube and thereby the pressure within the elongate hole is regulated.

The pressure tube can in principle be of any material. In an embodiment the pressure tube is of a thermo-moldable material, e.g. a material which may be molded or drawn at a fiber drawing tower. Advantageously the pressure tube is of silica optionally comprising a polymer coating. In an embodiment at least the supply section of the pressure tube has an outer polymer coating and optionally the pressure tube length section is free of polymer coating. The polymer coating increases the pliability of the pressure tube and reduces the risk of rupture of the pressure tube.

By providing the pressure tube of silica with a pressure tube length section with an uncoated pressure tube length section and a pressure tube supply section with a polymer coating, a desirably large hollow part cross-sectional diameter of the pressure tube may be obtained while at the same time the pressure tube supply section may be desirably pliable and rupture resistant.

As mentioned above several holes of the preform may be pressure controlled with pressure tubes as described above. The pressure tubes may be connected to the same pressure supply or to different pressure supplies.

All features of the invention and embodiments of the invention as described above including ranges and preferred ranges can be combined in various ways within the scope of the invention, unless there are specific reasons not to combine such features.

BRIEF DESCRIPTION OF THE DRAWINGS

The above and/or additional objects, features and advantages of the present invention will be further elucidated by the following illustrative and non-limiting detailed description of embodiments of the present invention, with reference to the appended drawings.

FIG. 13b is a graph showing the transmission loss for two variations of the hollow core PCF of the embodiment FIG. 13a.

DESCRIPTION OF EMBODIMENTS

Figure 1:
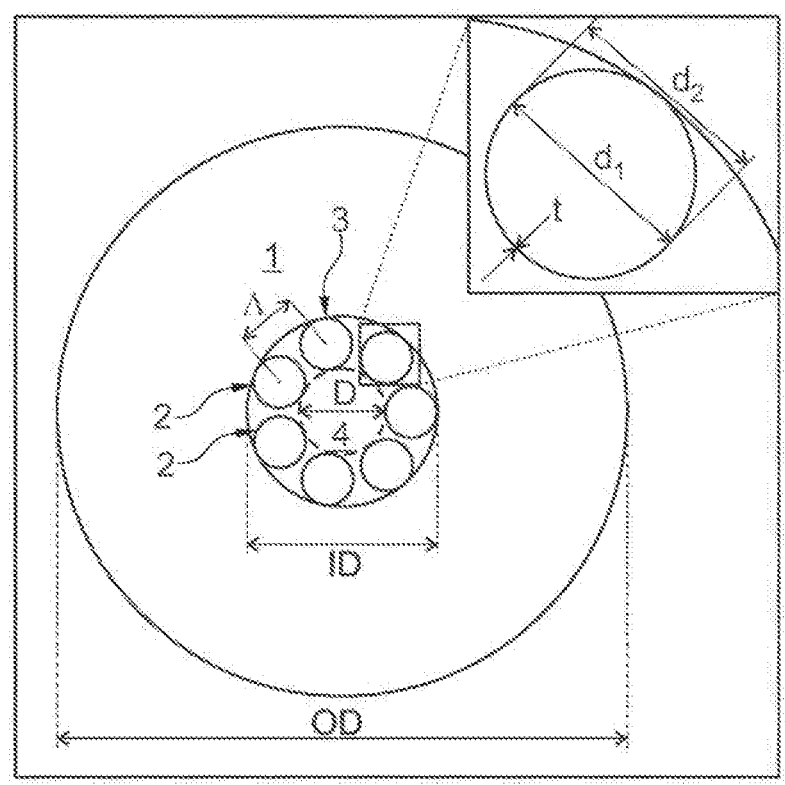
FIG. 1 shows a cross-section of an embodiment of a hollow core PCF of the invention where one of the hollow tubes is enlarged to show the inner diameter d1, the outer diameter d2 and the wall thickness t.

The figures are schematic and simplified for clarity. Throughout, the same reference numerals are used for identical or corresponding parts.

The hollow core PCF of the invention shown in FIG. 1 comprises an outer cladding region 1 and seven hollow tubes 2 surrounded by said outer cladding region. Each of the hollow tubes 2 is fused at fusing point 3 to the outer cladding 1 to form a ring defining an inner cladding region and a hollow core region 4 surrounded by the inner cladding region and having a core diameter D.

The hollow tubes are not touching each other and are generally referred to as non-touching hollow tubes. As shown in the enlargement of a hollow tube, each of the hollow tubes 2 has an average outer diameter d2 and an average inner diameter d1 and a wall thickness t in the center facing region of the respective hollow tubes 2. The outer cladding 1 has an inner diameter ID and an outer diameter OD. In this embodiment the hollow tubes 2 are identical and are substantially circular in cross section.

Figure 2:
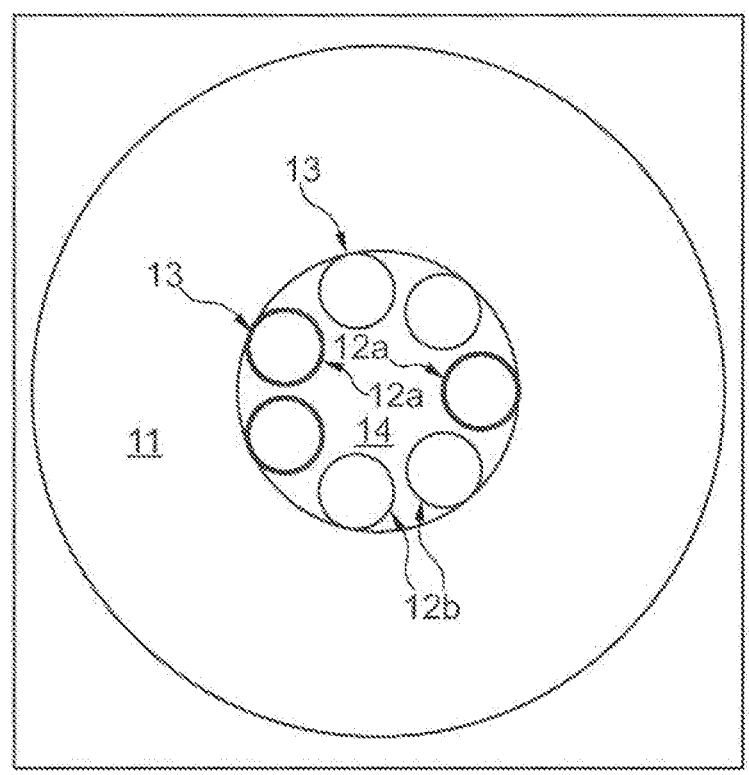
FIG. 2 shows a cross-section of an embodiment of a hollow core PCF of the invention where some of the hollow tubes have a larger wall thickness t than other of the hollow tubes.

In the embodiment shown in FIG. 2 the hollow core PCF comprises an outer cladding region 11 and seven non-touching hollow tubes 12a, 12b surrounded by said outer cladding region where the hollow tubes 12a, 12b are fused at fusing point 13 to the outer cladding 11 to form a ring defining an inner cladding region and a hollow core region 14 surrounded by the inner cladding region. Three of the non-touching hollow tubes 12a have a larger wall thickness t than the remaining four of the non-touching hollow tubes 12b. As shown each of the respective seven non-touching hollow tubes 12a, 12b is uniform in thickness, thereby providing a simpler production of the hollow core PCF.

Figure 3:
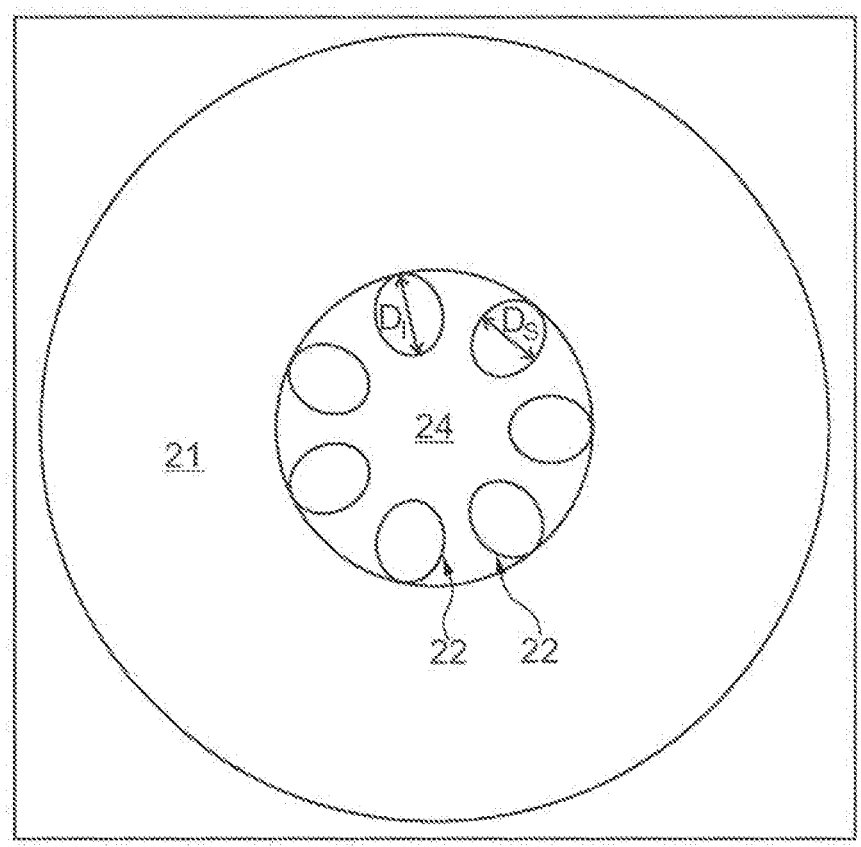
FIG. 3 shows a cross-section of an embodiment of a hollow core PCF of the invention where the hollow tubes are oval.

In the embodiment shown in FIG. 3 the hollow core PCF comprises an outer cladding region 21 and seven identical non-touching hollow tubes 22 surrounded by said outer cladding region, and the hollow tubes 22 are fused to the outer cladding 21 to form a ring defining an inner cladding region and a hollow core region 24 surrounded by the inner cladding region. The hollow tubes 22 are oval and each of the hollow tubes 22 has a long inner diameter $D_l$ and a short inner diameter $D_s$ perpendicular to the long inner diameter $D_l$, wherein $D_l$ is determined in radial direction.

Figure 4:
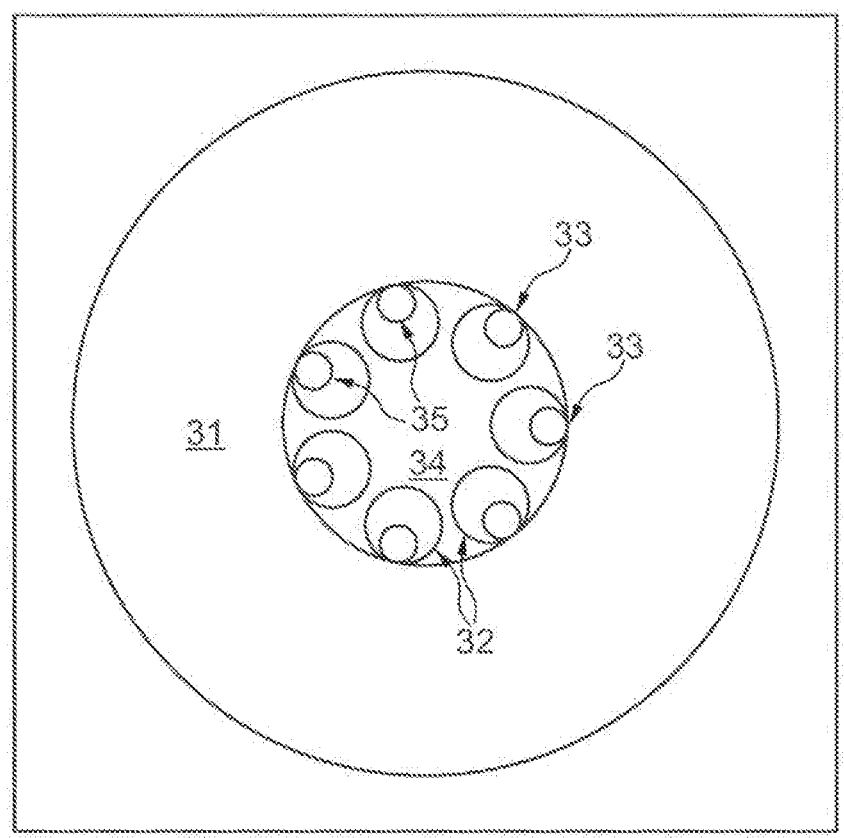
FIG. 4 shows a cross-section of an embodiment of a hollow core PCF of the invention where the hollow tubes comprise nested sub tubes arranged in the hollow structure of hollow tubes and fused to the hollow tubes.

In the embodiment shown in FIG. 4 the hollow core PCF comprises an outer cladding region 31 and seven identical non-touching hollow tubes 32 surrounded by said outer cladding region, and the hollow tubes 32 are fused at fusing points 33 to the outer cladding 31 to form a ring defining an inner cladding region and a hollow core region 34 surrounded by the inner cladding region. The hollow tubes 32 comprise nested sub tubes 35 arranged in the hollow structure of the hollow tubes and fused to the hollow tubes at the fusing points 33 at their respective maximal radial distance to the core center axis.

Figure 5:
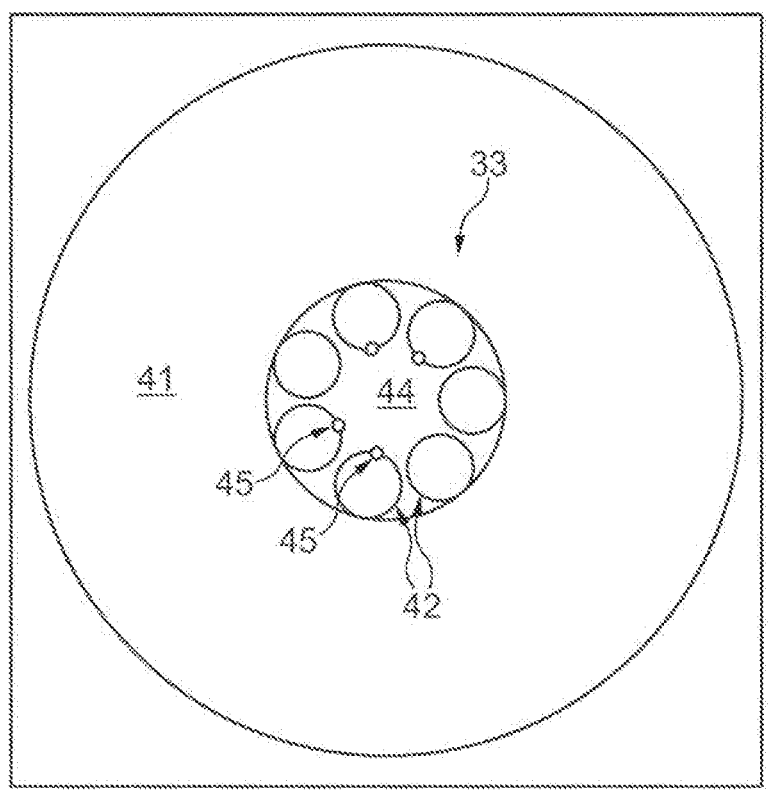
FIG. 5 shows a cross-section of an embodiment of a hollow core PCF of the invention where the hollow tubes comprise nodules arranged at a core center facing region.

In the embodiment shown in FIG. 5 the hollow core PCF comprises an outer cladding region 41 and seven non-touching hollow tubes 42a, 42b surrounded by said outer cladding region where the hollow tubes 42a, 42b are fused to the outer cladding 41 to form a ring defining an inner cladding region and a hollow core region 44 surrounded by the inner cladding region. Four of the non-touching hollow tubes 12a are uniform in thickness of their respective walls whereas the remaining three of the non-touching hollow tubes 42b comprise nodules 45 arranged at a core center facing region of the respective hollow tubes. Since the outer diameter d2 of the respective non-touching hollow tubes 42a, 42b is substantially identical, the nodules 45 are arranged at a boundary of the hollow core region.

Figure 6:
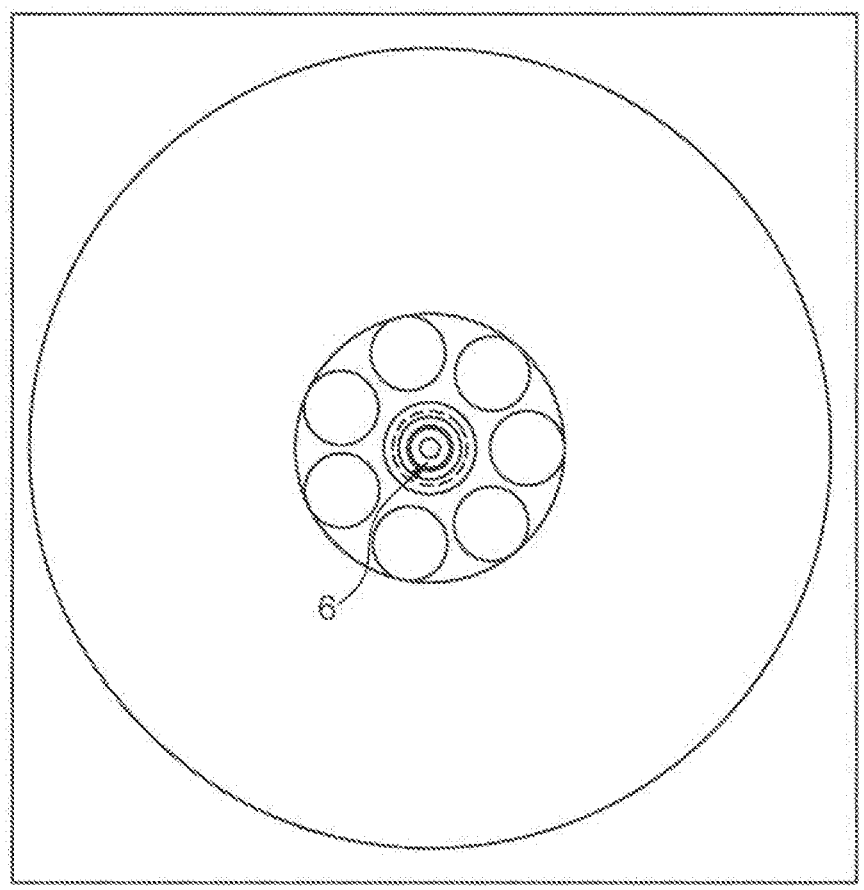
FIG. 6 shows a cross-section of an embodiment of a hollow core PCF of the invention where single mode light has been fed to the hollow core PCF.

In the embodiment shown in FIG. 6 the hollow core PCF mainly has a structure as the hollow core PCF of FIG. 1. A not shown single mode laser source is arranged to laser light to the PCF at wavelength in a low loss transmission band of the PCF. After 5 m or even 10 the beam transmitted in the PCF as indicated with ref. 6 has a Gaussian beam quality and is fully single mode. After 10 m of transmission the loss in the fundamental mode is very low e.g. with a transmission efficiency of more than 85%, such as more than 90%.

Figure 7:
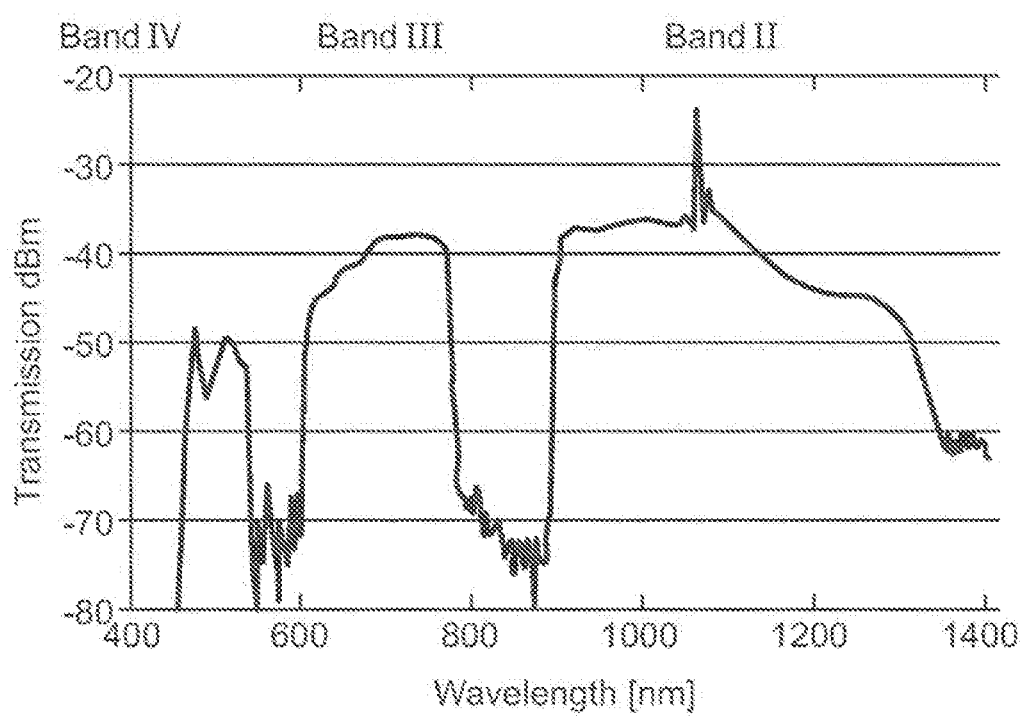
FIG. 7 is a graph showing several low loss transmission bands of a hollow core PCF of an embodiment of the invention.

The graph of FIG. 7 shows several low loss transmission bands of a fiber with the structure shown in FIG. 1 and a core size D of about 30 µm and t=750 nm. Bands are numbered from longest wavelength band to shorter wavelength bands with increasing number. As seen the hollow core PCF has four bands of low loss transmission, wherein 3 of the low loss transmission bands comprise wavelengths below 1.2 µm.

Figure 8:
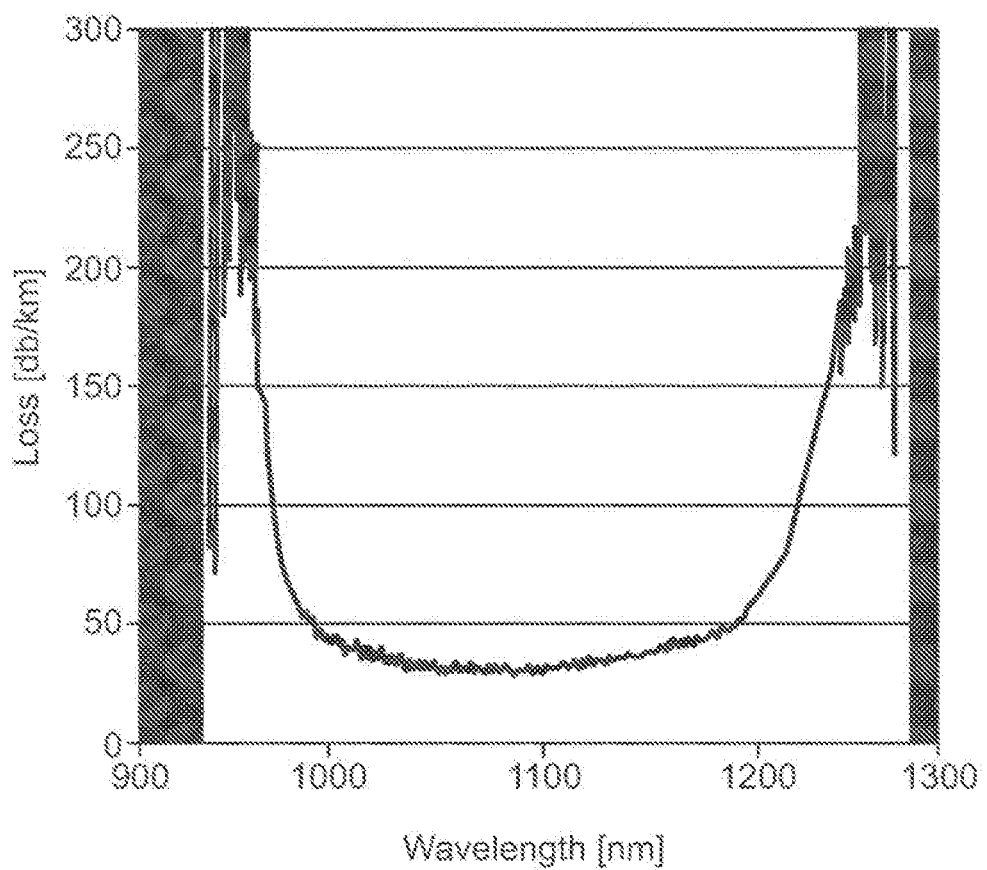
FIG. 8 is a graph showing a broad low loss transmission band of a hollow core PCF of an embodiment of the invention.

The graph of FIG. 8 shows a closer view of a transmission loss of the hollow core PCF of FIG. 1 with D=30 µm and t=750 nm of transmission band II. It can be seen that the low loss transmission band is very broad with a bandwidth of 200-250 nm around 1.0641 µm.

A simulation was made for a hollow core PCF with six hollow tubes (prior art hollow core PCF) and with a hollow core PCF with seven hollow tubes (an embodiment of the invention). The simulation was done with D=30 µm, t=750 nm, @1032 nm.

Figure 9:
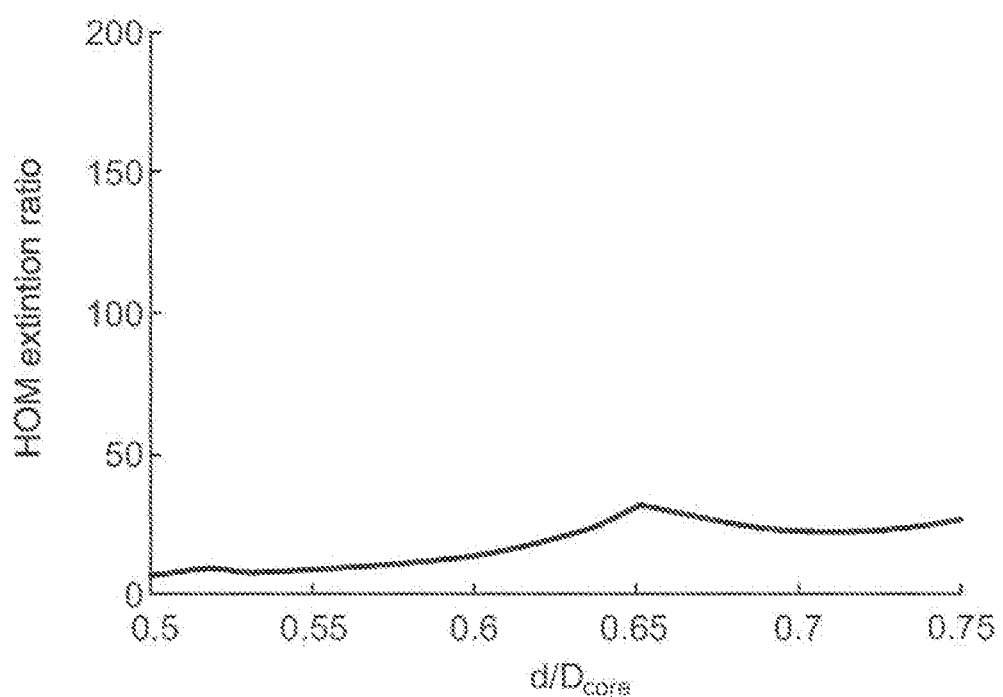
FIG. 9 is a graph showing the suppression of HOMs of a prior art hollow core PCF with six hollow tubes.
Figure 10:
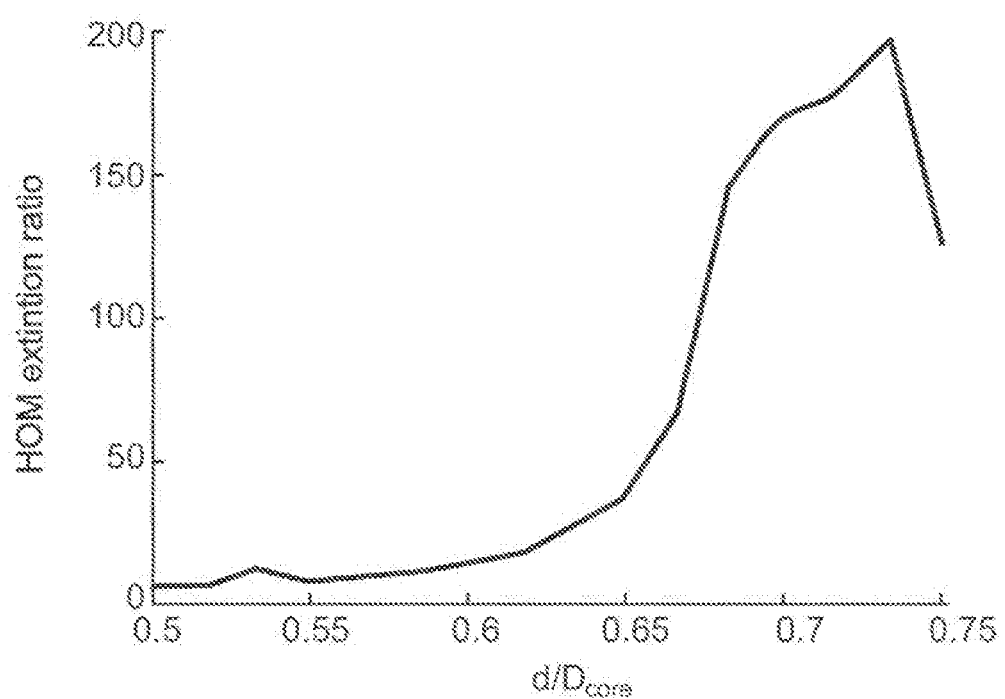
FIG. 10 is a graph showing the suppression of HOMs of hollow core PCF of an embodiment of the invention with seven hollow tubes.

FIGS. 9 and 10 show HOM extinction ratio relative to d/D (D=Dcore) of the prior art hollow core PCF with six hollow tubes (FIG. 9) and the hollow core PCF of an embodiment of the invention with seven hollow tubes (FIG. 10).

As it can be seen in FIG. 10 an optimal ratio d/D between 0.6 and 0.75 ensures that Lp11-like modes and several other HOMs of higher order are resonantly coupled to cladding modes.

In FIG. 9 it can be seen that use of six hollow tubes allows achieving a partly suppression of the Lp11-like modes. However, modes with a higher azimuthal number remain unperturbed limiting the overall HOM extinction.

Thus it is clearly shown that the hollow core PCF of the invention with seven hollow tubes has much improved properties for suppression of HOMs than the prior art hollow core PCF with six hollow tubes.

Further comparison between hollow core PCF of an embodiment of the invention and hollow core PCF having six hollow tubes are disclosed in the article "Hollow-core fibers for high power pulse delivery" by Michieletto et al. Optics Express 7103-7119, March 2016. The content of this article is hereby incorporated by reference into this disclosure with the proviso that in case of any inconsistence between the subject matter explicitly disclosed herein and the incorporated subject matter, the content of the subject matter explicitly disclosed herein prevail.

Figure 11:
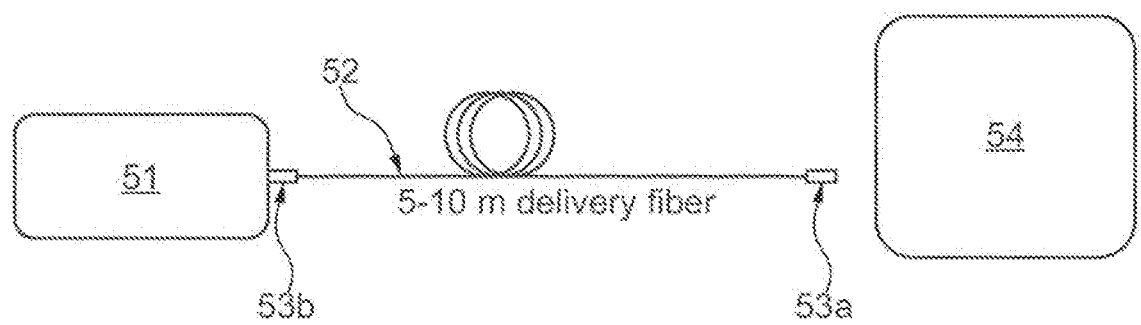
FIG. 11 is a schematic drawing of a laser system of an embodiment of the invention as well as a user apparatus.

The laser system shown in FIG. 11 comprises a laser light source 51 and a fiber delivery cable 52 for delivering light from the laser light source 51 to a user apparatus 54. The fiber delivery cable 52 comprises as its waveguide a hollow core PCF as described above with one or more low loss transmission bands correlated to the user apparatus. As indicated the fiber delivery cable 52 may be rather long while still delivering single mode light with high efficiency and low loss in the fundamental mode to the user apparatus 54. The fiber delivery cable 52 has a first end 53a and a second end 53b. In the shown embodiment each of the first end 53a and the second end 53b are mounted in a ferrule structure for connecting respectively to the user apparatus 54 and the laser light source 5.

In an alternative not shown embodiment the second end of the fiber delivery cable 52 is spliced to a fiber output of the laser light source 51.

Figure 12:
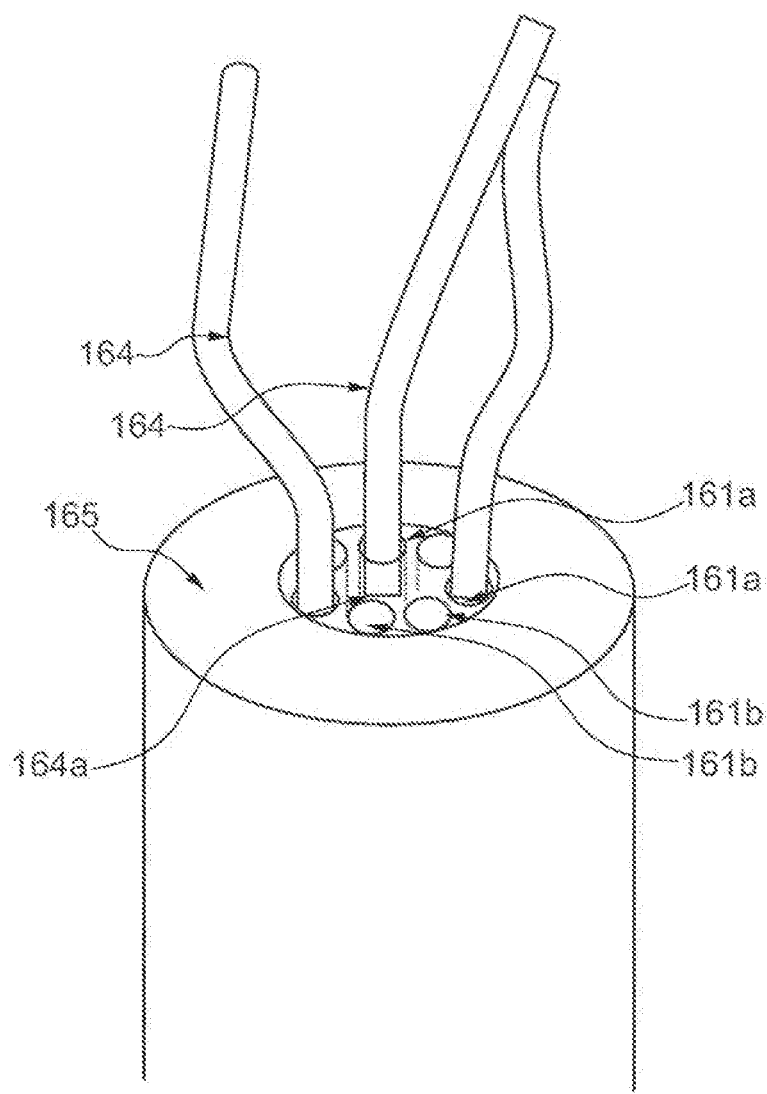
FIG. 12 illustrates a first end of a preform for an embodiment of a hollow core PCF of the invention with 7 hollow tubes forming 7 elongate holes and where the first ends of the respective pressure tubes are inserted into respective holes for pressure controlling of the holes during drawing.

The preform shown in FIG. 12 is a preform for an embodiment of the hollow core fiber as described herein.

The preform comprises a preform outer cladding region 165 and 7 hollow preform tubes 161a, 161b arranged in a non-touching ring (i.e. the tubes are not touching each other) surrounded by and fused to the preform outer cladding region 165.

Pressure tubes 164 are arranged to connect each of three of the preform tubes 161a (primary hollow tubes) to a not shown pressure supply for controlling the pressure in the primary hollow tubes 161a during drawing. A pressure tube length section 164a inserted into the hole of each primary hollow tube 161a is advantageously uncoated silica, whereas the remaining part of the pressure tube 164, referred to as the pressure tube supply section is polymer coated silica. The pressure in the secondary hollow tubes 161b may advantageously be controlled in a pressure chamber such as shown in FIGS. 15 and 16 of PA 2016 70262 DK with the title "A RING ELEMENT FOR A PREFORM, A PREFORM AND AN OPTICAL FIBER DRAWN FROM THE PREFORM".

Figure 13A:
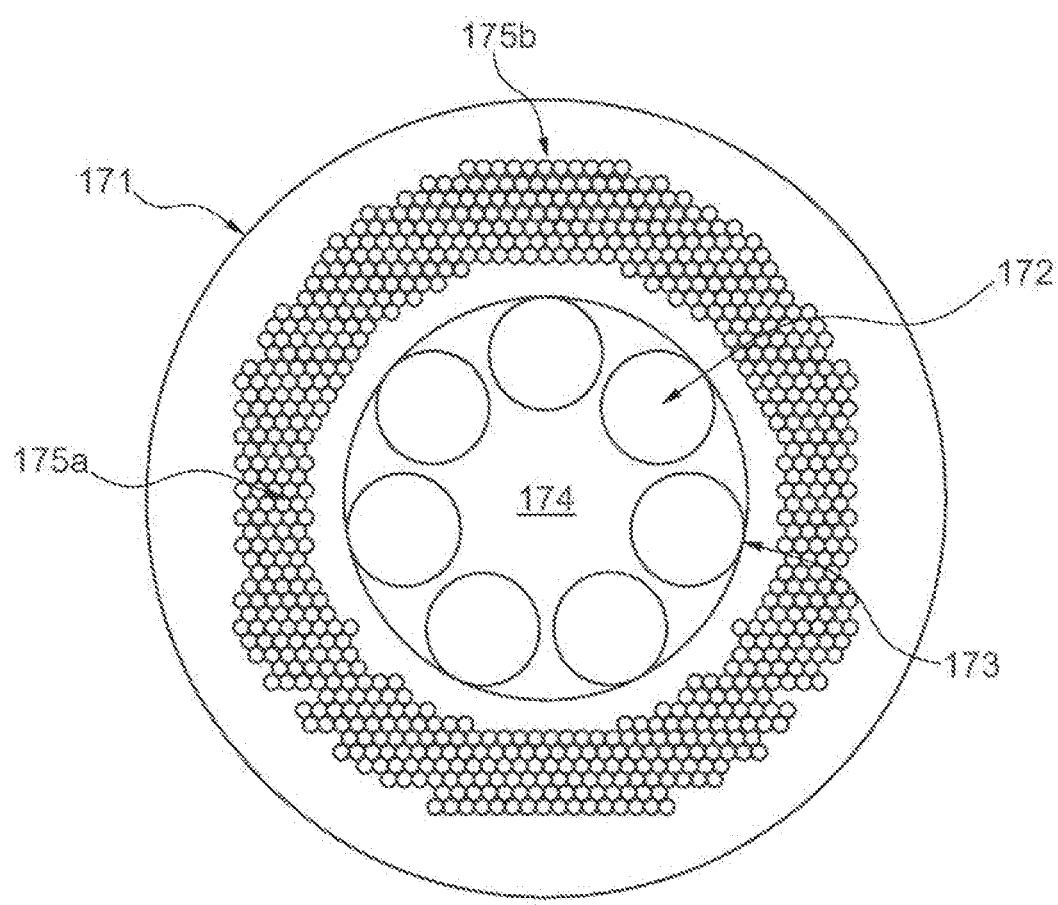
FIG. 13a illustrates a hollow core PCF of an embodiment of the invention comprising an outer cladding region comprising a photonic band gap structure.

In the embodiment shown in FIG. 13a the hollow core PCF comprises an outer cladding region 171 and seven non-touching hollow tubes 172 forming an inner cladding region and surrounded by said outer cladding region 171. The hollow tubes 172 are fused at fusing points 173 to the inner side of the outer cladding 171 to form the inner cladding region and a hollow core region 174 surrounded by the inner cladding region. The outer cladding region comprises a photonic band gap structure in the form of microstructures (inclusions) 175a having different index than the cladding background material 175b.

The photonic bandgap (PBG) structure may be provided by any means, e.g. by providing the outer cladding region with an index grating comprising concentric rings with different refractive index and/or by including.

The inclusions 175a in the outer background material 175b are arranged in a cross-sectional pattern comprising about 5 rings.

As mentioned it is preferred that the inclusions are voids or of gas and have a relatively small diameter and are arranged with short for optimizing (minimizing) confinement loss of the desired wavelength or range of wavelength.

Figure 13B:
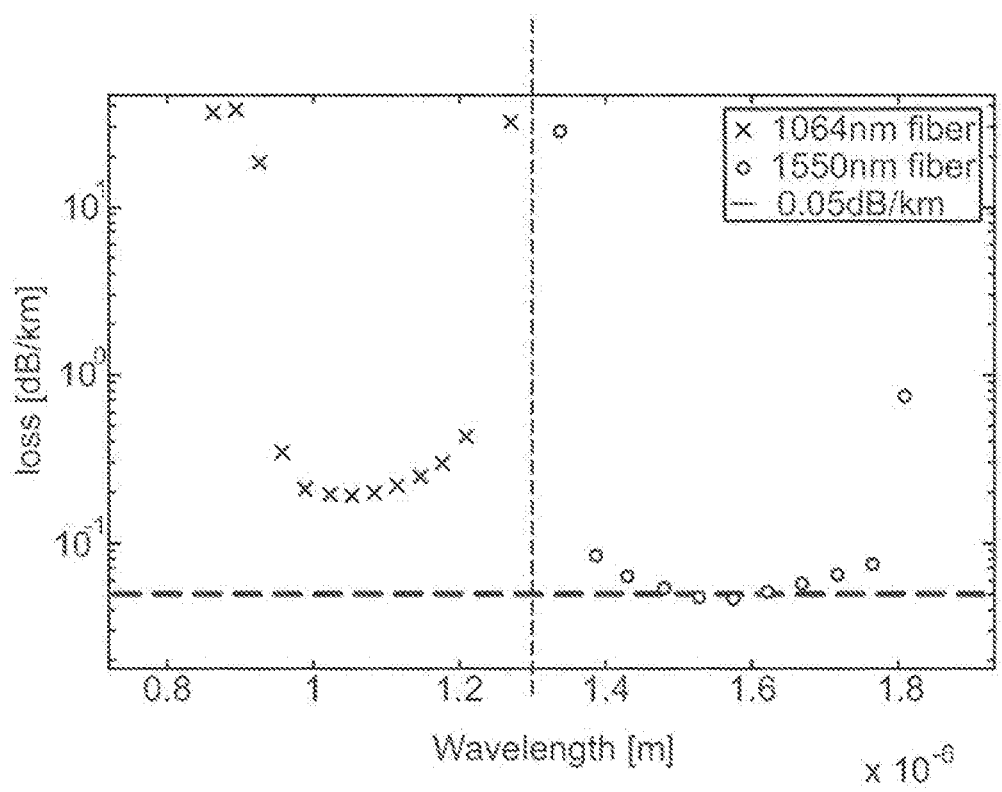

FIG. 13b shows the transmission loss for two variations of the hollow core PCF of the embodiment FIG. 13a. wherein the two variations of the hollow core PCF with PBG structure in their respective cladding have been optimized for reducing the confinement loss around a desired center wavelength of respectively 1064 nm (left) and 1550 nm (right). As it can be seen the loss is very low. Further it is found that this approach to reduce the confinement loss can be also be exploited in polarization maintaining antiresonant fibers.

Further it was found that the confinement loss appears to be arbitrary reduced by increasing the total thickness of the photonic band gap structure.

Example 1

Figure 14:
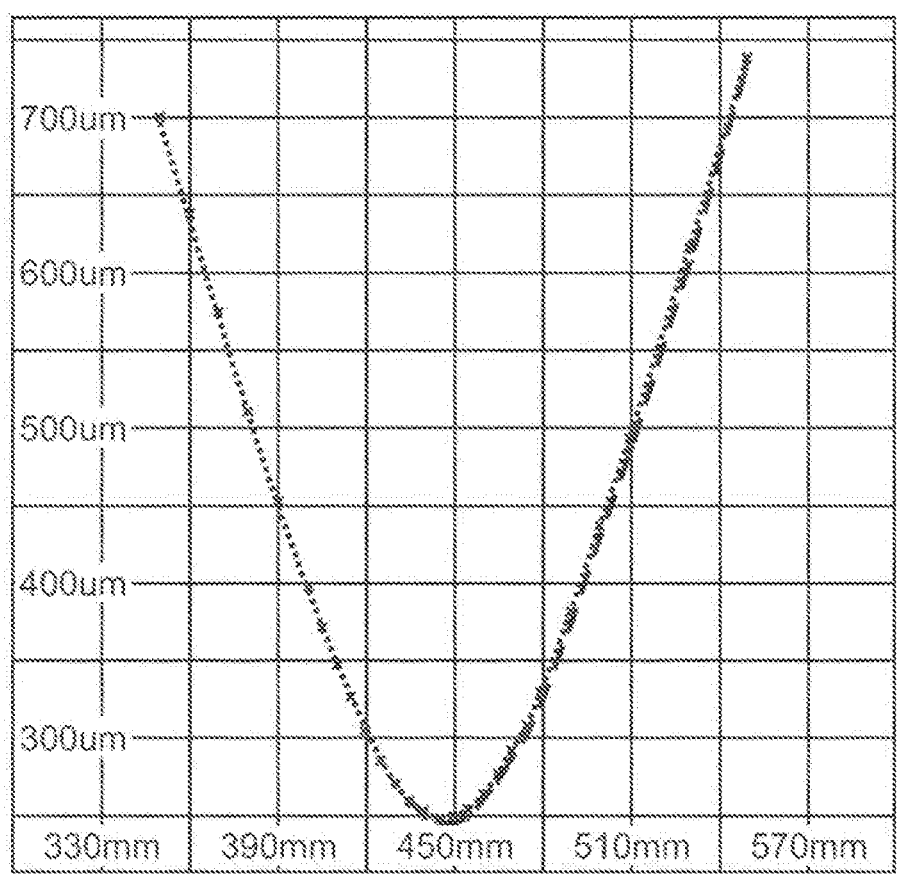
FIG. 14 is a graph showing a measurement of the beam quality $M^2$ of the fiber fabricated in EXAMPLE 1.

A hollow core PCF having a structure as shown in FIG. 1 was fabricated using the stack and raw technique. The fabricated fiber shown has a core diameter of approximately 30 μm, d2 ~17 μm with a d2/D~0.57. The mode field diameter measured at 1064 nm is 2 2 μm. The tubes present minor size differences, nonetheless the fiber shows remarkable low loss and bend loss and good mode quality. The mode quality factor of the fabricated fiber was measured the mode quality factor with a camera-based $M^2$ measurement system (Spiricon M2-2OOS) with a laser at a wavelength of 1064 nm and a 5 m FUT. We performed the measurements: with the fiber coiled on a standard 8 cm spool and no further coils. The results are summarized in Table I and shown in FIG. 14. The fiber output beam presents negligible astigmatism and asymmetry and a $M^2$ of 1.2.

TABLE 1

| Asymmetry | Astigmatism | $M^2$ X | $M^2$ Y |
|---|---|---|---|
| 1.02 | 0.01 | 1.22 | 1.2 |

EMBODIMENTS

1. A hollow core photonic crystal fiber (PCF) comprising an outer cladding region and 7 hollow tubes surrounded by said outer cladding region, wherein each of said hollow tubes is fused to said outer cladding region to form a ring defining an inner cladding region and a hollow core region surrounded by said inner cladding region, wherein said hollow tubes are not touching each other.

2. The hollow core PCF of embodiment 1, wherein said hollow tubes each have an average outer diameter d2 and an average inner diameter d1, wherein d1/d2 is equal to or larger than about 0.8, such as equal to or larger than about 0.85, such as equal to or larger than about 0.9.

3. The hollow core PCF of embodiment 1 or embodiment 2, wherein said hollow tubes have a center to center distance A between adjacent hollow tubes which is between about 1.01*d2 and about 1.5*d2, such as between 1.05*d2 and 1.2*d2.

4. The hollow core PCF of any one of the preceding embodiments, wherein said hollow tubes have substantially parallel center axes.

5. The hollow core PCF of any one of the preceding embodiments, wherein said hollow core region has a core diameter D of from about 10 μm to about 100 μm, such as from about 10 am to about 60 μm, such as from about 20 am to about 50 μm, such as from about 25 am to about 40 μm.

6. The hollow core PCF of embodiment 5, wherein said average outer tube diameter relative to the core diameter d2/D is from about 0.5 to about 0.75, such as from about 0.65 to about 0.72.

7. The hollow core PCF of any one of the preceding embodiments, wherein each of said hollow tubes comprises a core center facing region with a wall thickness t, wherein said wall thickness is up to about 2.1 μm, such as up to about 1 μm, such as in the range from about 150 to about 350 nm or in the range from about 650 to about 850 nm or in the range from about 900 to about 2.1 μm.

8. The hollow core PCF of embodiment 7, wherein said wall thickness t of each of said hollow tubes is substantially identical, preferably said hollow tubes are substantially identical and are arranged with identical distance to adjacent hollow tubes.

9. The hollow core PCF of embodiment 7, wherein at least one of the hollow tubes has a different wall thickness t than at least one other of the hollow tubes, preferably 3 of the hollow tubes have a wall thickness and the remaining 4 hollow tubes have another wall thickness.

10. The hollow core PCF of embodiment 9, wherein at least one of the hollow tubes has a wall thickness which is at least about 5% larger than the wall thickness of at least one other of the hollow tubes, preferably at least one of the hollow tubes has a wall thickness which is at least about 10% larger than the wall thickness of at least one other of the hollow tubes.

11. The hollow core PCF of any one of the preceding embodiments, wherein each of said hollow tubes is substantially circular.

12. The hollow core PCF of any one of the preceding embodiments, wherein each of said hollow tubes has a long inner diameter $D_l$ and a short inner diameter $D_s$ perpendicular to the long inner diameter $D_l$, wherein $D_l$ is determined in radial direction.

13. The hollow core PCF of any one of the preceding embodiments, wherein at least one of said hollow tubes comprises a nested sub tube arranged in the hollow structure of said hollow tube and fused to said hollow tube, said sub tube has an average outer diameter $d_{sub}$, which is substantially smaller than said average inner diameter d of said hollow tube, said average outer diameter $d2_{sub}$ is preferably up to about 0.9*d2 of said hollow tube, such as up to about 0.9*d2, preferably said internal sub tube is fused to said hollow tube at its maximal radial distance to the core center axis.

14. The hollow core PCF of any one of the preceding embodiments, wherein at least one of said hollow tubes comprises one or more nodules arranged at a core center facing region of one or more of the hollow tubes, preferably said nodules are arranged at a boundary of the hollow core region, said nodules are preferably arranged to be anti-resonant at an operating wavelength, so that light of a fundamental mode is substantially excluded from the nodules.

15. The hollow core PCF of any one of the preceding embodiments, wherein the minimum distance between adjacent hollow tubes is at least about 0.1 μm, such as at least about 1 μm, such as at least about 2 μm, such as at least about 5 μm.

16. The hollow core PCF of any one of the preceding embodiments, wherein the hollow core region and said hollow tubes independently of each other comprise gas selected from air, argon, nitrogen or mixtures comprising any of the mentioned gasses, optionally said hollow core region and said hollow tubes independently of each other are vacummated or filled with pressurized gas.

17. The hollow core PCF of any one of the preceding embodiments, wherein the outer cladding region has an outer diameter of at least about 125 μm, 150 μm, such as at least about 200 μm.

18. The hollow core PCF of any one of the preceding embodiments, wherein the outer cladding region and/or the hollow tubes comprise a solid glass material, preferably said solid material is of silica, optionally doped with refractive index modifying dopant.

19. The hollow core PCF of any one of the preceding embodiments, wherein the outer cladding region comprises a photonic bandgap structure surrounding said inner cladding region.

20. The hollow core PCF of embodiment 19, wherein the outer cladding region comprises a outer background material having a refractive index $N_{oc}$ and a plurality of inclusions having a refractive index different from the refractive index of the background material, said plurality of inclusions in the outer background material is preferably arranged in a cross-sectional pattern comprising at least two rings of inclusions surrounding the inner cladding region, such as at least 3 rings, such as at least 4 rings of inclusions.

21. The hollow core PCF of embodiment 20, wherein the plurality of inclusions in the outer background material is arranged in a substantially hexagonal pattern.

22. The hollow core PCF of embodiment 20 or embodiment 21, wherein the plurality of inclusions are of solid material, such as down doped solid material e.g. doped with fluorine and/or boron.

23. The hollow core PCF of embodiment 20 or embodiment 21, wherein the plurality of inclusions are voids or of gas, such as air.

24. The hollow core PCF of any one of embodiments 20-23, wherein said plurality of inclusions have an average diameter ($d_{inc}$) of up to about 2.5 μm, such as up to about 2 μm, such as between about 1.1 μm and 1.8 μm, such as between about 1.15 am and about 1.7 μm, such as between about 1.2 μm and about 1.5 μm, such as about 1.3 μm.

25. The hollow core PCF of any one of embodiments 20-24, wherein said plurality of inclusions are arranged at a pitch ($\Lambda_{inc}$) of up to about 6 μm, such as up to about 5 μm, such as up to about 4 μm, such as between about 2 μm and 4 am.

26. A laser system for delivering laser light to a user apparatus, said laser system comprising a laser light source and a fiber delivery cable for delivering light from the laser light source to the user apparatus, wherein said fiber delivery cable comprises a hollow core PCF according to any one of the preceding embodiments.

27. The laser system of embodiment 26, wherein said laser light source is configured for generating laser light pulses and is optically connected to said fiber delivery cable, preferably said laser light source is a femtosecond laser source.

28. The laser system of embodiment 27, wherein said laser light source has a pump duration of from about 30 fs to about 30 ps, such as from about 100 fs to about 10 ps.

29. The laser system of embodiment 27 or embodiment 28, wherein said laser light source has a peak power determined at the exit of the laser light source which is at least about 5 kW, such as at least about 10 kW, such as at least about 30 kW, such as at least about 50 kW.

30. The laser system of any one of embodiments 27-29, wherein said laser light source is a mode locked laser, such as an actively mode locked laser or a passively mode locked laser, said mode locked laser preferably comprises one or more amplifiers.

31. The laser system of any one of embodiments 26-30, wherein said hollow core PCF is configured for single mode guiding of at least one wavelength in the range from about 200 nm to about 4.5 μm, preferably at least one wavelength in the range from 1000 nm to about 1100 nm.

32. The laser system of embodiment 31, wherein said hollow core PCF is configured for guiding a continuum of light wavelengths, preferably spanning over at least about 0.1 μm, such as at least about 0.3 μm, such as at least about 0.5 μm.

33. The laser system of any one of embodiments 26-32, wherein said hollow core PCF has a first fiber end which is adapted for being connected to said user apparatus and a second fiber end optically connected to an output fiber of said laser light source via a fiber coupling structure.

34. The laser system of embodiment 26, wherein said fiber coupling structure comprises at least one of
a focusing lens,
a graded-index element (GRIN),
a protection element, or
a ferrule structure.

35. The laser system of embodiment 33 or embodiment 34, wherein said first fiber end fiber is mounted in a ferrule structure.

The invention claimed is:

1. A hollow core photonic crystal fiber (PCF) comprising an outer cladding region and a plurality of hollow tubes surrounded by said outer cladding region, each of said hollow tubes having an average inner tube diameter $d_1$ and an average outer tube diameter $d_2$,
where each of said hollow tubes is fused to said outer cladding region to form a ring defining an inner cladding region and a hollow core region surrounded by said inner cladding region,
wherein at least one of said hollow tubes comprises a nested sub-tube having an average outer sub-tube diameter $d_{sub}$ smaller than the average inner diameter $d_1$ of said hollow tube and arranged in the hollow structure of the hollow tube and fused to the hollow tube,
wherein the at least one of said hollow tubes forms a first tubular element, and wherein the nested sub-tube forms a second tubular element with a third tubular element nested within the second tubular element,
wherein each of said hollow tubes comprises a core center facing region with a wall thickness, and
wherein the hollow core region and/or one or more of the plurality of hollow tubes are evacuated from gas.

2. The hollow core PCF of claim 1, wherein at least one of the plurality of hollow tubes has a different wall thickness than at least one other of the plurality of hollow tubes.

3. The hollow core PCF of claim 1, wherein said hollow tubes are not touching each other.

4. The hollow core PCF of claim 1, wherein said nested sub-tube is fused to said hollow tube at its maximal radial distance to the core center axis.

5. The hollow core PCF of claim 1, wherein said hollow tubes have a center to center distance $\Lambda$ between adjacent hollow tubes which center to center distance is between about 1.01*d2 and about 1.5*d2.

6. The hollow core PCF of claim 1, wherein the minimum distance between adjacent hollow tubes is at least about 0.1 µm.

7. The hollow core PCF of claim 1, wherein said hollow core region has a core diameter D defined as the diameter of the largest circle inscribed by the hollow tubes.

8. The hollow core PCF of claim 7, wherein the hollow core region diameter D is from about 10 µm to about 100 µm.

9. The hollow core PCF of claim 7, wherein said average outer tube diameter relative to the core diameter d2/D is from about 0.5 to about 0.75.

10. The hollow core PCF of claim 7 wherein said average outer tube diameter relative to the core diameter d2/D is from about 0.65 to about 0.72.

11. The hollow core PCF of claim 1, wherein said plurality of hollow tubes comprises 7 hollow tubes.

12. The hollow core PCF of claim 1, wherein said plurality of hollow tubes consist of 7 hollow tubes.

13. The hollow core PCF of claim 1, wherein the sub-tube average outer diameter drub, is substantially smaller than said average inner diameter $d_1$ of said hollow tube.

14. The hollow core PCF of claim 1, wherein said wall thickness is up to about 2.1 µm.

15. A laser system for delivering laser light, said laser system comprising a laser light source and a fiber delivery cable for delivering light from the laser light source, wherein said fiber delivery cable comprises a hollow core PCF according to claim 1.

16. The laser system of claim 15, wherein said laser light source has a pulse duration of from about 30 fs to about 30 ps and a peak power determined at the exit of the laser light source which is at least about 5 kW.

17. The hollow core PCF of claim 1, wherein the hollow core region and/or one or more of the plurality of hollow tubes are evacuated from gas to a pressure of about 1 mbar or less, at standard temperature.

18. The hollow core PCF of claim 1, wherein the hollow core region and/or one or more of the plurality of hollow tubes are evacuated from gas to a pressure of about 0.1 mbar or less, at standard temperature.

19. The hollow core PCF of claim 1, wherein the hollow core region and/or one or more of the plurality of hollow tubes are evacuated from gas to a pressure of about 0.01 mbar or less, at standard temperature.

* * * * *